United States Patent
Wang et al.

(10) Patent No.: US 11,979,632 B2
(45) Date of Patent: May 7, 2024

(54) MULTI-DEVICE COLLABORATION METHOD, ELECTRONIC DEVICE, AND MULTI-DEVICE COLLABORATION SYSTEM

(71) Applicant: HUAWEI TECHNOLOGIES CO., LTD., Shenzhen (CN)

(72) Inventors: Yafei Wang, Shanghai (CN); Xiaowen Wang, Shenzhen (CN); Shoujie Zhang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 18/005,324

(22) PCT Filed: Jul. 9, 2021

(86) PCT No.: PCT/CN2021/105603
§ 371 (c)(1),
(2) Date: Jan. 12, 2023

(87) PCT Pub. No.: WO2022/012444
PCT Pub. Date: Jan. 20, 2022

(65) Prior Publication Data
US 2023/0345074 A1    Oct. 26, 2023

(30) Foreign Application Priority Data
Jul. 13, 2020   (CN) .......................... 202010677649.2

(51) Int. Cl.
*H04N 21/436*     (2011.01)
*H04N 21/41*      (2011.01)
(Continued)

(52) U.S. Cl.
CPC ....... *H04N 21/436* (2013.01); *H04N 21/4122* (2013.01); *H04N 21/4302* (2013.01); *H04N 21/4518* (2020.08)

(58) Field of Classification Search
CPC ............. H04N 21/436; H04N 21/4518; H04N 21/4122; H04N 21/4302
See application file for complete search history.

(56) References Cited

U.S. PATENT DOCUMENTS

| | | | |
|---|---|---|---|
| 2015/0080072 A1* | 3/2015 | Kim | A63F 13/814 463/7 |
| 2015/0193654 A1* | 7/2015 | Sakai | G06V 40/23 382/103 |
| 2017/0291086 A1* | 10/2017 | Lee | A63F 13/833 |

FOREIGN PATENT DOCUMENTS

WO    WO-2017115887 A1 *  7/2017  ............. A63F 13/20

OTHER PUBLICATIONS

Kundu, "Huawei HarmonyOS vs Google Android vs iOS: How They Differ?," Trak.in, XP093101105, pp. 1-3 (Aug. 14, 2019).

* cited by examiner

*Primary Examiner* — Nicholas T Corbo
(74) *Attorney, Agent, or Firm* — Leydig, Voit & Mayer, Ltd.

(57) ABSTRACT

A distributed system is run in a device in the method. The distributed system includes a system service, a first-type service located at an upper layer of the system service, and a second-type service located at an upper layer of the first-type service and having an interface display function. Both the first-type service and the second-type service are atomic services. A second device migrates a teaching video to a first device, and the first device plays the teaching video. A second-type service in the first device may call a first-type service in another device, to control the another device to capture a user action picture video, process the teaching video and the user action picture video to obtain teaching guidance, and play the teaching guidance.

20 Claims, 13 Drawing Sheets

(51) Int. Cl.
*H04N 21/43* (2011.01)
*H04N 21/45* (2011.01)

MULTI-DEVICE COLLABORATION METHOD, ELECTRONIC DEVICE, AND MULTI-DEVICE COLLABORATION SYSTEM

This application is a National Stage of International Application No. PCT/CN2021/105603, filed on Jul. 9, 2021, which claims priority to Chinese Patent Application No. 202010677649.2, filed on Jul. 13, 2020. Both of the aforementioned application are hereby incorporated by reference in their entireties.

TECHNICAL FIELD

This application relates to the field of multi-device collaboration, and in particular, to a multi-device collaboration method, an electronic device, and a system.

BACKGROUND

With the development of network technologies, network teaching has become a new teaching mode, for example, motion teaching and dance teaching. A user plays a teaching video by using a mobile phone, and projects the teaching video played on the mobile phone to a large-screen device for easy viewing (for example, a television, a tablet computer, or a smart screen). The user learns teaching actions by following the teaching video played on the large-screen device. A user action picture video is captured by a camera, and a learning effect is determined based on the teaching video and the user action picture video.

In the network teaching process, a plurality of devices are required. Because different operating systems may be run in the plurality of devices, a separate application (APP) version needs to be developed for each device in the network teaching process. Even if a same operating system (for example, an Android system) is run in the plurality of devices, a separate APP version also needs to be developed for each device, leading to low development efficiency. In addition, the plurality of devices in which the current operating systems are run need to implement information exchange through signaling. Therefore, a delay of information transmission in the video teaching process implemented by the plurality of devices is long.

SUMMARY

Embodiments of this application provide a multi-device collaboration method, an electronic device, and a multi-device collaboration system, to resolve problems of low development efficiency of a video teaching method implemented by a plurality of devices and a long information transmission delay in a video teaching process.

To achieve the foregoing objectives, the following technical solutions are used in this application.

A first aspect provides a multi-device collaboration method, applied to a first device in which a distributed system is run, where the distributed system includes a system service, a first-type service located at an upper layer of the system service, and a second-type service located at an upper layer of the first-type service and having an interface display function, and both the first-type service and the second-type service are atomic services. The method includes: The first device plays, through a first teaching service in the first device, a first video synchronized by a second device through a second teaching service in the second device, where the first teaching service and the second teaching service each belong to the second-type service; the first device calls a video capture service in a third device through the first teaching service, where the video capture service is used to control a camera apparatus in the third device to capture a second video; the first device calls a video processing service in a fourth device through the first teaching service, where the video processing service is used to control the fourth device to process the first video and the second video, to obtain a comparison analysis result of the first video and the second video; and the first device calls a voice broadcast service in a fifth device through the first teaching service, where the voice broadcast service is used to control a speaker in the fifth device to play the comparison analysis result, where the video capture service, the video processing service, and the voice broadcast service are all first-type services.

A distributed system is run in each of a plurality of devices for performing the multi-device collaboration method, and the distributed system includes a system service, a first-type service located at an upper layer of the system service, and a second-type service located at an upper layer of the first-type service and having an interface display function. Therefore, in a development stage, a set of first-type services/second-type services may be developed, and the developed first-type services/second-type services are distributed to different devices, thereby improving development efficiency of video teaching in which a plurality of devices are used. In addition, because mutual calling may be implemented by using a distributed soft bus between the devices in which the distributed systems are run, in other words, a second-type service in one device may call a first-type service in another device, and there is a synchronization mechanism for data between the devices, efficiency of data synchronization between the devices in a video teaching process is improved, and transmission delays of various types of data are reduced. Moreover, a mobile phone synchronizes a teaching video to a large-screen device, so that a user has better viewing experience when performing learning by using the teaching video. Some large-screen devices may have weak computing capabilities. Therefore, a problem that a video processing capability of a large-screen device is insufficient is resolved through distributed computing by using a video processing capability of the mobile phone, to improve utilization of each device in an ecological chain, achieving strong usability and practicality.

In a possible implementation of the first aspect, the method further includes: The first device calls a motion data acquisition service in a sixth device through the first teaching service, where the motion data acquisition service is used to control the sixth device to acquire motion data, and the motion data acquisition service is the first-type service.

When performing motion learning by using the multi-device collaboration method provided in this embodiment of this application, the user has a requirement for obtaining motion data. The first device may call the motion data acquisition service in the sixth device through the first teaching service to obtain the motion data of the user. In addition, after obtaining the motion data of the user, the first device may further display the motion data of the user through the first teaching service, so that the user can conveniently view the motion data through a display of the first device, thereby improving user experience. In this way, a problem that a large-screen device cannot acquire the motion data of the user is resolved to improve utilization of each device in the ecological chain, achieving strong usability and practicality.

In a possible implementation of the first aspect, before the first device calls the video capture service in the third device through the first teaching service, the method further includes: The first device obtains information about each device in a target network, where the target network is a network in which the first device is located; the first device determines at least one third candidate device based on the information about each device in the target network, where the at least one third candidate device is a device with a video capture function in the target network; and the first device determines the third device from the at least one third candidate device.

When there are a plurality of devices with a video capture function in the network in which the first device is located, the third device may be determined from the plurality of devices with a video capture function based on an actual case, so that the first teaching service in the first device may send a request for calling the video capture service to the third device.

In a possible implementation of the first aspect, that the first device determines the third device from the at least one third candidate device includes: the first device determines one or more devices with a highest video capture priority that are in the at least one third candidate device, as the third device; or the first device displays information about the at least one third candidate device through the first teaching service, to indicate a user to select one or more devices based on the displayed information about the at least one third candidate device, and the first device determines the selected one or more devices as the third device.

The first device may determine the third device from third candidate devices based on at least two manners. The third device may be determined by using a preset video capture priority, and user participation is not required in a process in which the first device determines the third device, thereby improving user experience. Alternatively, information about the third candidate devices may be displayed on the first device, and the user selects one or more of the third candidate devices as the third device, thereby improving flexibility of a video teaching process.

In a possible implementation of the first aspect, after the first device determines the third device from the at least one third candidate device, the method further includes: If the third device does not have a video capture service, the first device sends a first instruction to the third device, where the first instruction is used to instruct the third device to download a video capture service adapted to the third device; or if the third device does not have a video capture service, the first device sends a video capture service in the first device to the third device, where the video capture service in the first device is used to indicate the third device to obtain, based on the video capture service in the first device, a video capture service adapted to the third device.

In a possible implementation of the first aspect, that the first device plays, through the first teaching service in the first device, the first video synchronized by the second device through the second teaching service in the second device includes: if the first device does not have a first teaching service, the first device obtains a first teaching service adapted to the first device; the first device receives, through the first teaching service, synchronization data of the first video sent by the second teaching service in the second device, and the first device plays the first video through the first teaching service based on the synchronization data; or if the first device has a first teaching service, after the first device receives synchronization data of the first video through the first teaching service, the first device plays the first video through the first teaching service based on the synchronization data.

In a possible implementation of the first aspect, that the first device obtains the first teaching service adapted to the first device includes: after receiving a second instruction sent by the second device, the first device downloads the first teaching service adapted to the first device; or after receiving the second teaching service sent by the second device, the first device obtains, based on the second teaching service, the first teaching service adapted to the first device.

After the first-type services and the second-type services for implementing video teaching are developed for the plurality of devices, another device in a same network as the first device may not have the first-type service and/or the second-type service. The first-type service and the second-type service in the distributed system provided in this application do not need to be independently developed for each device. Instead, one device may push the first-type service or the second-type service to another device, so that the another device has the first-type service or the second-type service. Alternatively, one device may send a download instruction to another device, so that the another device can download the first-type service or the second-type service from a preset server, without requiring the user to download and install a corresponding atomic service on the another device in advance. This improves user experience, and improves flexibility of a multi-device collaboration-based video teaching process.

In a possible implementation of the first aspect, when there are a plurality of fourth devices, that the first device calls the video processing service in the fourth device through the first teaching service includes: the first device calls video processing services in at least two fourth devices in a serial manner through the first teaching service, to control the at least two fourth devices to process the first video and/or the second video in a serial manner; and/or the first device calls video processing services in at least two fourth devices in a parallel manner through the first teaching service, to control the at least two fourth devices to process the first video and/or the second video in a parallel manner.

The first device may properly allocate computing resources based on computing capabilities of different devices in the network in which the first device is located, thereby increasing a video processing speed and improving video processing efficiency.

A second aspect provides a multi-device collaboration method, applied to a collaborating device in which a distributed system is run, where the distributed system includes a system service and a first-type service located at an upper layer of the system service, and the first-type service is an atomic service; and the method includes:

The collaborating device performs at least one of the following operations after receiving a calling request sent by a first device through a first teaching service in the first device:

if the calling request is a request for calling a video capture service, the collaborating device controls, through a video capture service in the collaborating device, a camera apparatus in the collaborating device to capture a second video;

if the calling request is a request for calling a video processing service, the collaborating device controls, through a video processing service in the collaborating device, the collaborating device to process a first video and/or the second video, where the first video is a teaching video;

if the calling request is a request for calling a voice broadcast service, the collaborating device controls, through a voice broadcast service in the collaborating device, a speaker in the collaborating device to play a comparison analysis result, where the comparison analysis result is a comparison analysis result of the first video and the second video; and if the calling request is a request for calling a video capture service, the collaborating device controls, through a motion data acquisition service in the collaborating device, a motion data acquisition apparatus in the collaborating device to acquire motion data, where the video capture service, the video processing service, the voice broadcast service, and the motion data acquisition service are all first-type services.

In a possible implementation of the second aspect, the distributed system further includes a second-type service located at an upper layer of the first-type service and having an interface display function, and the second-type service is an atomic service; and the method further includes: The collaborating device initiates migration of the first video to the first device through a second teaching service in the collaborating device.

In a possible implementation of the second aspect, that the collaborating device initiates migration of the first video to the first device through the second teaching service in the collaborating device includes: if the first device does not have a first teaching service, the collaborating device pushes the second teaching service to the first device, where the second teaching service is used to indicate the first device to obtain, based on the second teaching service, a first teaching service adapted to the first device; and the collaborating device sends synchronization data of the first video to the first teaching service in the first device through the second teaching service; or if the first device does not have a first teaching service, the collaborating device sends a second instruction to the first device, where the second instruction is used to instruct the first device to download a first teaching service adapted to the first device; and the collaborating device sends synchronization data of the first video to the first teaching service in the first device through the second teaching service.

In a possible implementation of the second aspect, before the collaborating device initiates migration of the first video to the first device through the second teaching service in the collaborating device, the method further includes: The collaborating device obtains information about each device in a target network, where the target network is a network in which the collaborating device is located; the collaborating device determines at least one first candidate device based on the information about each device in the target network, where the at least one first candidate device is a device with a video playing function in the target network;

and the collaborating device determines the first device from the at least one first candidate device.

In a possible implementation of the second aspect, that the collaborating device determines the first device from the at least one first candidate device includes: The collaborating device determines one device with a highest video playing priority in the at least one first candidate device, as the first device; or the collaborating device displays information about the at least one first candidate device through the second teaching service, to indicate a user to select one device based on the displayed information about the at least one first candidate device; and the collaborating device determines the selected one device as the first device.

A third aspect provides an electronic device in which a distributed system is run. The distributed system includes a system service, a first-type service located at an upper layer of the system service, and a second-type service located at an upper layer of the first-type service and having an interface display function, where both the first-type service and the second-type service are atomic services. The electronic device includes:

a playing unit, configured to play a first video synchronized by a second device; and a calling unit, configured to call a video capture service in a third device, where the video capture service is used to control a camera apparatus in the third device to capture a second video, where the calling unit is further configured to call a video processing service in a fourth device, where the video processing service is used to control the fourth device to process the first video and the second video, to obtain a comparison analysis result of the first video and the second video; and the calling unit is further configured to call a voice broadcast service in a fifth device, where the voice broadcast service is used to control a speaker in the fifth device to play the comparison analysis result, where the video capture service, the video processing service, and the voice broadcast service are all first-type services.

A fourth aspect provides an electronic device in which a distributed system is run. The distributed system includes a system service and a first-type service located at an upper layer of the system service, and the first-type service is an atomic service. The electronic device includes:

a processing unit, configured to: after receiving a request for calling a first teaching service in a first device, perform at least one of the following operations:

controlling, through a video capture service, a camera apparatus to capture a second video;

controlling, through a video processing service, the electronic device to process a first video and/or the second video, where the first video is a teaching video;

controlling, through a voice broadcast service, a speaker to play a comparison analysis result, where the comparison analysis result is a comparison analysis result of the first video and the second video; and controlling, through a motion data acquisition service, a motion data acquisition apparatus to acquire motion data, where the video capture service, the video processing service, the voice broadcast service, and the motion data acquisition service are all first-type services.

A fifth aspect provides an electronic device, including a processor. The processor is configured to run a computer program stored in a memory, to implement the method according to any implementation of the first aspect of this application.

A sixth aspect provides an electronic device, including a processor. The processor is configured to run a computer program stored in a memory, to implement the method according to any implementation of the second aspect of this application.

According to a seventh aspect, a multi-device collaboration system is provided, including the electronic device provided in the fifth aspect and at least one electronic device provided in the sixth aspect.

An eighth aspect provides a chip system, including a processor. The processor is coupled to a memory, and the processor executes a computer program stored in the memory, to implement the method according to any implementation of the first aspect of this application and/or the method according to any implementation of the second aspect.

A ninth aspect provides a computer-readable storage medium. The computer-readable storage medium stores a computer program. When the computer program is executed by one or more processors, the method according to any implementation of the first aspect of this application and/or the method according to any implementation of the second aspect are/is implemented.

According to a tenth aspect, an embodiment of this application provides a computer program product. When the computer program product runs on a device, the device is enabled to perform the method according to any implementation of the first aspect and/or the method according to any implementation of the second aspect.

It may be understood that, for beneficial effects of the second aspect to the tenth aspect, refer to related descriptions in the first aspect. Details are not described herein again.

DESCRIPTION OF EMBODIMENTS

In the following descriptions, for illustration instead of limitation, specific details such as a particular system structure and a technology are provided to make a thorough understanding of embodiments of this application. However, a person skilled in the art should know that this application can be practiced in other implementations without these specific details.

It should be understood that, when used in this specification and the appended claims of this application, the term "include" indicates the existence of the described feature, entity, step, operation, element and/or component, but does not exclude the existence or addition of one or more other features, entities, steps, operations, elements, components and/or a combination thereof.

It should also be understood that, in embodiments of this application, "one or more" means one or two or more; and "and/or" describes an association relationship for describing associated objects and represents that three relationships may exist. For example, A and/or B may represent the following three cases: Only A exists, both A and B exist, and only B exists. A and B each may be in a singular or plural form. The character "/" usually indicates an "or" relationship between associated objects.

In addition, in the description of this specification of this application and the appended claims, the terms "first", "second", "third", and the like are only used for distinguishing descriptions, but cannot be understood as indicating or implying relative importance.

Reference to "one embodiment", "some embodiments", or the like described in this specification of this application means that one or more embodiments of this application include a particular feature, structure, or feature described with reference to this embodiment. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

Figure 1:
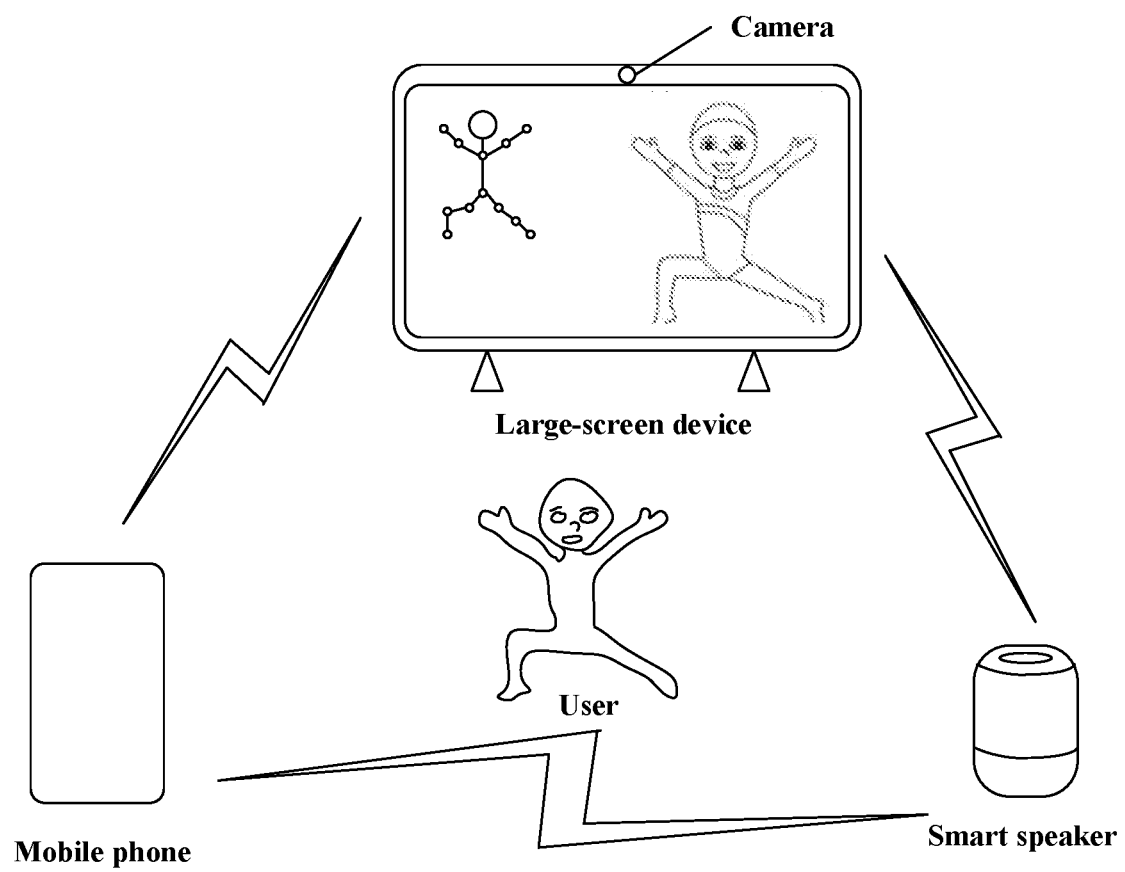
FIG. 1 is a schematic diagram of an application scenario of a multi-device collaboration method according to an embodiment of this application.

Embodiments of this application may be applied to an application scenario of multi-device collaboration. Refer to FIG. 1. FIG. 1 shows an application scenario of a multi-device collaboration method according to an embodiment of this application. In the application scenario, there are a plurality of devices, for example, a mobile phone, a large-screen device (which is an electronic device with a large screen, for example, a television, a smart screen, and a computer), and a smart speaker. In the figure, the mobile phone, the large-screen device, and the smart speaker form a multi-device collaboration system to implement the multi-device collaboration method provided in this embodiment of this application.

In the application scenario, the mobile phone, the large-screen device, and the smart speaker are located in a same network, and the same network may be a wireless network or may be a wired network. A wireless network (Wi-Fi) is used as an example. The mobile phone, the large-screen device, and the smart speaker are all connected to same indoor Wi-Fi, and the mobile phone, the large-screen device, and the smart speaker in the same Wi-Fi may communicate with each other based on the Wi-Fi. A user may select a teaching video by using an APP in the mobile phone, and project the teaching video in the mobile phone to the large-screen device. When the large-screen device plays the teaching video, the user may perform learning by following the teaching video on site. In an example in which the teaching video is a motion video, the user may follow the motion video played by the large-screen device, to perform an action shown in the motion video. In addition, a camera in the large-screen device may capture a user action picture video, and the large-screen device transmits the captured user action picture video to the mobile phone. The teaching video and the user action picture video are analyzed based on an intelligent algorithm in the mobile phone, to determine whether the action of the user in a learning process is standard, and provide learning guidance to the user. Moreover, the learning guidance may be synchronized to the smart speaker, and the learning guidance may be played by using the smart speaker.

In the foregoing application scenario, the mobile phone synchronizes the teaching video to the large-screen device, so that the user has better viewing experience when performing learning by using the teaching video. The large-screen device may have a weak computing capability. Therefore, a problem that a video processing capability of the large-screen device is insufficient is resolved through distributed computing by using a video processing capability of the mobile phone, to improve utilization of each device in an ecological chain.

It should be understood that, the application scenario of motion teaching is used as an example in the foregoing. In actual application, there may be another application scenario of multi-device collaboration, for example, an application scenario of dance teaching or an application scenario of live broadcast teaching.

An embodiment of this application provides a multi-device collaboration method. An electronic device for performing the multi-device collaboration method may be a first device described subsequently. The first device may be an electronic device such as a tablet computer, a smart screen, a large-screen device, a television, or a notebook computer. The multi-device collaboration method may alternatively be performed by a second device, a third device, a fourth device, a fifth device, and a sixth device described subsequently. Any one of the second device to the sixth device is referred to as a collaborating device, and the collaborating device may be an electronic device such as a mobile phone, smart screen, a large-screen device, a tablet computer, a camera apparatus, a wearable device, or a smart speaker. For example, the second device may be a mobile phone, the third device may be a smart screen or may be a camera apparatus, the fourth device may be a mobile phone or may be a tablet computer, the fifth device may be a smart speaker, and the sixth device may be a sports watch. A specific type of the electronic device is not limited in embodiments of this application.

Figure 2:
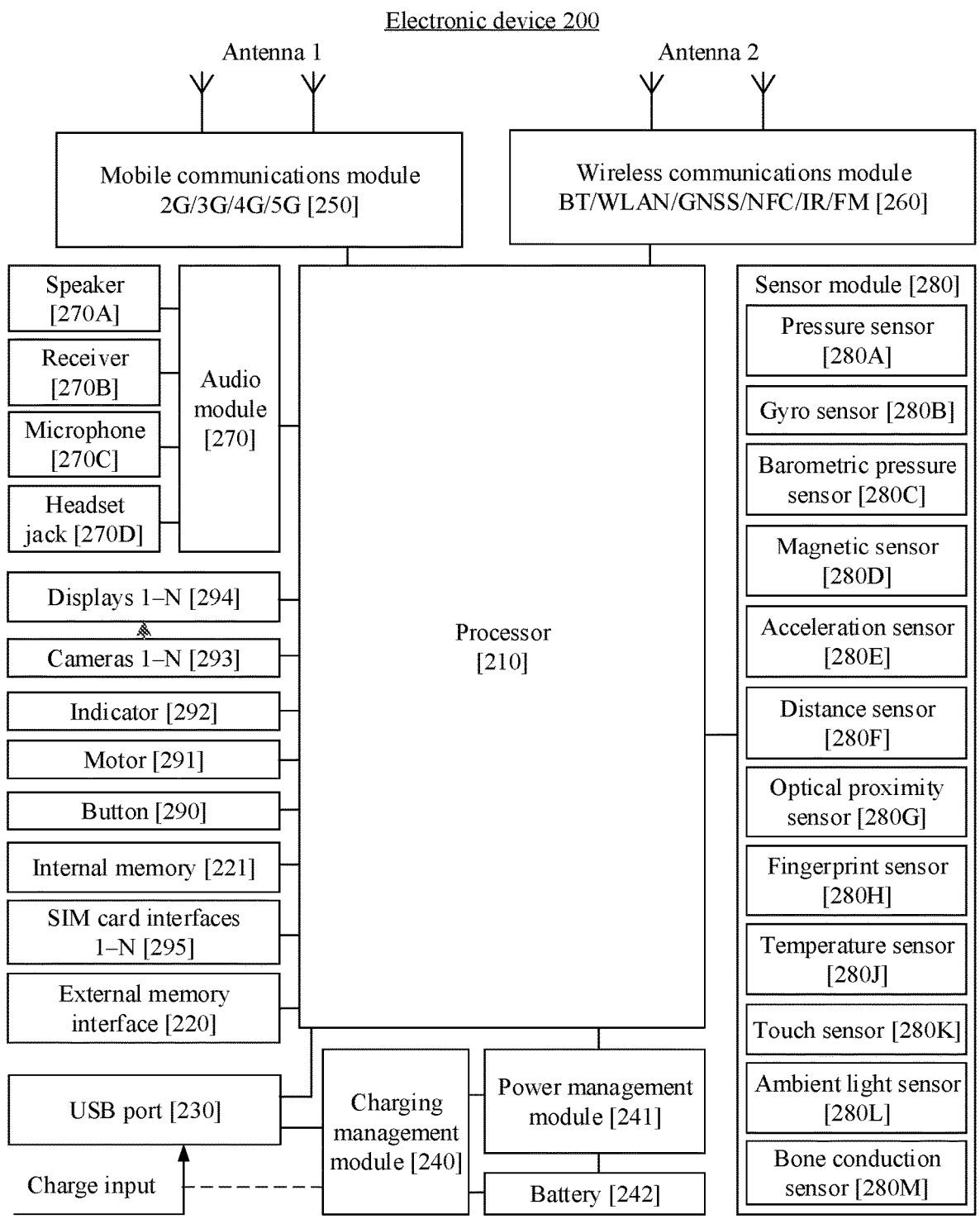
FIG. 2 is a schematic diagram of a hardware structure of an electronic device for performing a multi-device collaboration method according to an embodiment of this application.

FIG. 2 is a schematic diagram of a structure of an electronic device. The electronic device 200 may include a processor 210, an external memory interface 220, an internal memory 221, a universal serial bus (USB) port 230, a charging management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a button 290, a motor 291, an indicator 292, a camera 293, a display 294, a subscriber identification module (SIM) card interface 295, and the like. The sensor module 280 may include a pressure sensor 280A, a gyro sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that the structure shown in this embodiment of this application does not constitute a specific limitation on the electronic device 200. In some other embodiments of this application, the electronic device 200 may include more or fewer components than those shown in the figure, or some components may be combined, or some components maybe split, or there may be different component arrangements. The components shown in the figure may be implemented by using hardware, software, or a combination of software and hardware.

For example, when the electronic device 200 is a mobile phone, the electronic device 200 may include all the components in the figure or may include only some of the components in the figure.

When the electronic device 200 is a large-screen device, the electronic device 200 may include the processor 210, the external memory interface 220, the internal memory 221, the universal serial bus (USB) port 230, the charging management module 240, the power management module 241, the wireless communications module 260, the audio module 270, the speaker 270A, the receiver 270B, the microphone 270C, the camera 293, and the display 294 in the figure.

When the electronic device 200 is a camera apparatus, the electronic device 200 may include the processor 210, the internal memory 221, the universal serial bus (USB) port 230, the charging management module 240, the power management module 241, the wireless communications module 260, and the camera 293 in the figure.

When the electronic device 200 is a smart speaker, the electronic device 200 may include the processor 210, the internal memory 221, the charging management module 240, the power management module 241, the battery 242, the wireless communications module 260, the audio module 270, the speaker 270A, the receiver 270B, the microphone 270C, and the button 290 in the figure.

When the electronic device 200 is a sports band, the electronic device 200 may include the processor 210, the internal memory 221, the charging management module 240, the power management module 241, the battery 242, the wireless communications module 260, the sensor module 280, the button 290, the display 294, and the like in the figure. The sensor module 280 may include the gyro sensor 280B, the acceleration sensor 280E, the temperature sensor 280J, a heart rate sensor, a galvanic skin response sensor, and the like.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and a command center of the electronic device 200. The controller may generate an operation control signal based on instruction operation code and a time sequence signal, to complete control of instruction reading and instruction execution.

A memory may be further disposed in the processor 210, and is configured to store instructions and data. In some embodiments, the memory in the processor 210 is a cache. The memory may store instructions or data that has been used or is cyclically used by the processor 210. If the processor 210 needs to use the instructions or the data again, the processor may directly invoke the instructions or the data from the memory. This avoids repeated access, reduces waiting time of the processor 210, and improves system efficiency.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) port, and/or the like.

The I2C interface is a two-way synchronization serial bus, and includes one serial data line (SDA) and one serial clock line (SCL). In some embodiments, the processor 210 may include a plurality of groups of I2C buses. The processor 210 may be separately coupled to the touch sensor 280K, a charger, a flashlight, the camera 293, and the like through different I2C bus interfaces. For example, the processor 210 may be coupled to the touch sensor 280K through the I2C interface, so that the processor 210 communicates with the touch sensor 280K through the I2C bus interface, to implement a touch function of the electronic device 200.

The I2S interface may be used for audio communication. In some embodiments, the processor 210 may include a plurality of groups of I2S buses. The processor 210 may be coupled to the audio module 270 through the I2S bus, to implement communication between the processor 210 and the audio module 270. In some embodiments, the audio module 270 may transmit an audio signal to the wireless communications module 260 through the I2S interface.

The PCM interface may also be used for audio communication, and analog signal sampling, quantization, and coding. In some embodiments, the audio module 270 may be coupled to the wireless communications module 260 through a PCM bus interface.

In some embodiments, the audio module 270 may alternatively transmit an audio signal to the wireless communications module 260 through the PCM interface. Both the I2S interface and the PCM interface may be configured to perform audio communication.

The UART interface is a universal serial data bus, and is used for asynchronous communication. The bus may be a two-way communications bus. The bus allows to-be-transmitted data to be converted between serial communication and parallel communication.

In some embodiments, the UART interface is usually used to connect the processor 210 to the wireless communications module 260. For example, the processor 210 communicates with a Bluetooth module in the wireless communications module 260 through the UART interface, to implement a Bluetooth function. In some embodiments, the audio module 270 may transmit an audio signal to the wireless communications module 260 through the UART interface, to implement a function of playing music by using a Bluetooth headset.

The MIPI may be configured to connect the processor 210 to a peripheral component such as the display 294 or the camera 293. The MIPI includes a camera serial interface (CSI), a display serial interface (DSI), and the like. In some embodiments, the processor 210 communicates with the camera 293 through the CSI, to implement a photographing function of the electronic device 200. The processor 210 communicates with the display 294 through the DSI, to implement a display function of the electronic device 200.

The GPIO interface may be configured by using software. The GPIO interface may be configured as a control signal, or may be configured as a data signal. In some embodiments, the GPIO interface may be configured to connect the processor 210 to the camera 293, the display 294, the wireless communications module 260, the audio module 270, the sensor module 280, or the like. The GPIO interface may be further configured as the I2C interface, the I2S interface, the UART interface, the MIPI, or the like.

The USB port 230 is a port that conforms to a USB standard specification, and may be specifically a mini USB port, a micro USB port, a USB Type C port, or the like. The USB port 230 may be configured to connect to a charger to charge the electronic device 200, or may be configured to transmit data between the electronic device 200 and a peripheral device, or may be configured to connect to a headset, to play audio by using the headset. The port may be further configured to connect to another electronic device such as an AR device.

It may be understood that the interface connection relationships between the modules in this embodiment of this application are merely examples for description, and do not constitute a limitation on a structure of the electronic device 200. In some other embodiments of this application, the electronic device 200 may alternatively use an interface connection manner different from those in the foregoing embodiment, or use a combination of a plurality of interface connection manners.

The charging management module 240 is configured to receive a charge input from a charger. The charger may be a wireless charger or a wired charger. In some embodiments of wired charging, the charging management module 240 may receive a charging input from a wired charger through the USB port 230. In some embodiments of wireless charging, the charging management module 240 may receive a wireless charging input through a wireless charging coil of the electronic device 200. The charging management module 240 may further supply power to the electronic device by using the power management module 241 while charging the battery 242.

The power management module 241 is configured to connect to the battery 242, the charging management module 240, and the processor 210. The power management module 241 receives an input of the battery 242 and/or the charging management module 240, and supplies power to the processor 210, the internal memory 221, an external memory, the display 294, the camera 293, the wireless communications module 260, and the like. The power management module 241 may be further configured to monitor parameters such as a battery capacity, a battery cycle count, and battery health (electric leakage and impedance).

In some other embodiments, the power management module 241 may also be disposed in the processor 210. In some other embodiments, the power management module 241 and the charging management module 240 may alternatively be disposed in a same device.

A wireless communication function of the electronic device 200 may be implemented by using the antenna 1, the antenna 2, the mobile communications module 250, the wireless communications module 260, a modem processor, a baseband processor, and the like.

The antenna 1 and the antenna 2 are configured to transmit and receive an electromagnetic wave signal. Each antenna in the electronic device 200 may be configured to cover one or more communication bands. Different antennas may be reused to improve antenna utilization. For example, the antenna 1 may be reused as a diversity antenna in a wireless local area network. In some other embodiments, an antenna may be used in combination with a tuning switch.

The mobile communications module 250 may provide wireless communication solutions that are applied to the electronic device 200 and that include 2G/3G/4G/5G wireless communication solutions and the like. The mobile communications module 250 may include at least one filter, a switch, a power amplifier, a low noise amplifier (low noise amplifier, LNA), and the like. The mobile communications module 250 may receive an electromagnetic wave through the antenna 1, perform processing such as filtering or amplification on the received electromagnetic wave, and transmit the electromagnetic wave to the modem processor for demodulation. The mobile communications module 250 may further amplify a signal modulated by the modem processor, and convert the signal into an electromagnetic wave for radiation through the antenna 1.

In some embodiments, at least some functional modules of the mobile communications module 250 may be disposed in the processor 210. In some embodiments, at least some functional modules of the mobile communications module 250 and at least some modules of the processor 210 may be disposed in one device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 270A, the receiver 270B, and the like), or displays an image or a video on the display 294. In some embodiments, the modem processor may be an independent component. In some other embodiments, the modem processor may be independent of the processor 210, and the modem processor and the mobile communications module 250 or another functional module may be disposed in one device.

The wireless communication module 260 may provide a wireless communication solution that is applied to the electronic device 200 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communications module 260 may be one or more components integrating at least one communications processor module. The wireless communications module 260 receives an electromagnetic wave through the antenna 2, performs frequency modulation and filtering processing on an electromagnetic wave signal, and sends a processed signal to the processor 210. The wireless communications module 260 may further receive a to-be-sent signal from the processor 210, perform frequency modulation and amplification on the signal, and convert the signal into an electromagnetic wave for radiation through the antenna 2.

In some embodiments, in the electronic device 200, the antenna 1 and the mobile communications module 250 are coupled, and the antenna 2 and the wireless communications module 260 are coupled, so that the electronic device 200 can communicate with a network or another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a beidou navigation satellite system (BDS), a quasi-zenith satellite system (QZSS), and/or satellite based augmentation systems (SBAS).

The electronic device 200 may implement a display function through the GPU, the display 294, the application processor, and the like. The GPU is a microprocessor for image processing, and is connected to the display 294 and the application processor. The GPU is configured to: perform mathematical and geometric calculation, and perform image rendering. The processor 210 may include one or more GPUs that execute program instructions to generate or change display information.

The display 294 is configured to display an image, a video, or the like, for example, a teaching video and a user action picture video in embodiments of this application. The display 294 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 200 may include one or N displays 294, where N is a positive integer greater than 1.

The electronic device 200 can implement a photographing function by using the ISP, the camera 293, the video codec, the GPU, the display 294, the application processor, and the like.

The ISP is configured to process data fed back by the camera 293. For example, during photographing, when a shutter is open, light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of an image. The ISP may further optimize parameters such as exposure and a color temperature of a photographing scenario. In some embodiments, the ISP may be disposed in the camera 293.

The camera 293 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 200 may include one or N cameras 293, where N is a positive integer greater than 1.

The digital signal processor is configured to process a digital signal, and may process other digital signals other than the digital image signal. For example, when the electronic device 200 selects a frequency, the digital signal processor is configured to perform Fourier transform on frequency energy.

The video codec is configured to: compress or decompress a digital video. The electronic device 200 may support one or more types of video codecs. Therefore, the electronic device 200 may play or record videos in a plurality of coding formats, for example, moving picture experts group (MPEG)-1, MPEG-2, MPEG-3, and MPEG-4.

The NPU is a neural-network (NN) computing processor. The NPU quickly processes input information with a structure similar to a biological neural network, for example, a transfer mode between human brain neurons, and can continuously perform self-learning. Applications such as intelligent cognition of the electronic device 200, for example, image recognition, facial recognition, speech recognition, and text understanding, can be implemented through the NPU.

In this embodiment of this application, the NPU or another processor may be configured to perform an operation such as analysis processing on an image in a video stored in the electronic device 200.

The external memory interface 220 may be used to connect to an external storage card, for example, a micro SD card, to extend a storage capability of the electronic device 200. The external storage card communicates with the processor 210 through the external memory interface 220, to implement a data storage function. For example, files such as music and a video are stored in the external storage card.

The internal memory 221 may be configured to store computer-executable program code. The executable program code includes instructions. The processor 210 implements various functional applications and data processing of the electronic device 200 by running the instructions stored in the internal memory 221. The internal memory 221 may include a program storage area and a data storage area. The program storage area may store an operating system, an application required by at least one function (for example, a sound playing function or an image playing function). The data storage area may store data (such as audio data, an address book, and the like) created during use of the electronic device 200.

In addition, the internal memory 221 may include a high-speed random access memory, and may further include a nonvolatile memory, for example, at least one magnetic disk storage device, a flash memory device, or a universal flash storage (universal flash storage, UFS).

The electronic device 200 may implement an audio function through the audio module 270, the speaker 270A, the receiver 270B, the microphone 270C, the headset jack 270D, and the application processor.

The audio module 270 is configured to convert digital audio signal into an analog audio signal output, and is also configured to convert an analog audio input into a digital audio signal. The audio module 270 may be further configured to encode and decode an audio signal. In some embodiments, the audio module 270 may be disposed in the processor 210, or some functional modules of the audio module 270 are disposed in the processor 210.

The speaker 270A, also referred to as a "loudspeaker", is configured to convert an audio electrical signal into a sound signal. The electronic device 200 may be used for listening to music or answering a hands-free call by using the speaker 270A. For example, the speaker may play a comparison analysis result provided in this embodiment of this application.

The receiver 270B, also referred to as an "earpiece", is configured to convert an electrical audio signal into a sound signal. When a call is answered or audio information is listened to by using the electronic device 200, the receiver 270B may be put close to a human ear to listen to a voice.

The microphone 270C, also referred to as a "mike" or a "mic", is configured to convert a sound signal into an electrical signal. When making a call or sending speech information, a user may place the mouth of the user near the microphone 270C to make a sound, to input a sound signal to the microphone 270C. At least one microphone 270C is disposed in the electronic device 200. In some other embodiments, two microphones 270C may be disposed in the electronic device 200, to collect a sound signal and further implement a noise cancellation function. In some other embodiments, three, four, or more microphones 270C may be disposed in the electronic device 200, to collect a sound signal, implement noise cancellation, identify a sound source, implement a directional recording function, and the like.

The headset jack 270D is configured to connect to a wired headset. The headset jack 270D may be the USB port 230 or a 3.5 mm open mobile terminal platform (OMTP) standard interface or a cellular telecommunications industry association of the USA (CTIA) standard interface.

The pressure sensor 280A is configured to sense a pressure signal, and can convert a pressure signal into an electrical signal. In some embodiments, the pressure sensor 280A may be disposed on the display 294. There are a plurality of types of pressure sensors 280A, such as a resistive pressure sensor, an inductive pressure sensor, and a capacitive pressure sensor. The capacitive pressure sensor may include at least two parallel plates made of conductive materials. When a force is applied to the pressure sensor 280A, capacitance between electrodes changes. The electronic device 200 determines pressure intensity based on a capacitance change. When a touch operation is performed on the display 294, the electronic device 200 detects intensity of the touch operation through the pressure sensor 280A. The electronic device 200 may calculate a touch location based on a detection signal of the pressure sensor 280A.

In some embodiments, touch operations that are performed at a same touch location but have different touch intensity may correspond to different operation instructions. For example, when a touch operation whose touch intensity is less than a first pressure threshold is performed on an SMS message application icon, an instruction for viewing an SMS message is executed. When a touch operation whose touch intensity is greater than or equal to the first pressure threshold is performed on the SMS message application icon, an instruction for creating an SMS message is executed.

The gyro sensor 280B may be configured to determine a motion posture of the electronic device 200. In some embodiments, an angular velocity of the electronic device 200 around three axes (that is, axes x, y, and z) may be determined by using the gyro sensor 280B. The gyro sensor 280B may be configured to implement image stabilization during photographing. For example, when the shutter is pressed, the gyro sensor 280B detects an angle at which the electronic device 200 jitters, calculates, based on the angle, a distance for which a lens module needs to compensate, and allows the lens to cancel the jitter of the electronic device 200 through reverse motion, to implement image stabilization. The gyro sensor 280B may be further used in a navigation scenario and a motion-sensing gaming scenario.

The barometric pressure sensor 280C is configured to measure barometric pressure. In some embodiments, the electronic device 200 calculates an altitude based on a value of a barometric pressure measured by the barometric pressure sensor 280C, to assist in positioning and navigation.

The magnetic sensor 280D includes a Hall sensor. The electronic device 200 may detect opening and closing of a flip cover by using the magnetic sensor 280D. In some embodiments, when the electronic device 200 is a clamshell phone, the electronic device 200 may detect opening and closing of a flip cover based on the magnetic sensor 280D. Further, a feature such as automatic unlocking activated when the flip cover or the clamshell phone is opened is set based on a detected opening or closing state of the flip cover or the clamshell phone.

The acceleration sensor 280E may detect accelerations in various directions (usually on three axes) of the electronic device 200, detect a magnitude and a direction of gravity when the electronic device 200 is still, and identify a posture of the electronic device. The acceleration sensor 280E is used in an application such as switching between a landscape mode and a portrait mode or in a pedometer.

The distance sensor 280F is configured to measure a distance. The electronic device 200 may measure a distance by using infrared or laser. In some embodiments, in a photographing scenario, the electronic device 200 may measure a distance by using the distance sensor 280F, to implement quick focusing.

The optical proximity sensor 280G may include, for example, a light-emitting diode (LED) and an optical detector, for example, a photodiode. The light-emitting diode may be an infrared light-emitting diode. The electronic device 200 emits infrared light by using the light-emitting diode. The electronic device 200 detects reflected infrared light from an ambient object by using the photodiode. When sufficient reflected light is detected, the electronic device 200 may determine that there is an object near the electronic device 200. When insufficient reflected light is detected, the electronic device 200 may determine that there is no object near the electronic device 200. The electronic device 200 may detect, by using the optical proximity sensor 280G, that the user holds the electronic device 200 close to an ear for a call, to automatically turn off a screen for power saving. The optical proximity sensor 280G may also be used in a flip cover mode or a pocket mode to automatically unlock or lock the screen.

The ambient light sensor 280L is configured to sense ambient light brightness. The electronic device 200 may adaptively adjust brightness of the display 294 based on the sensed ambient light brightness. The ambient light sensor 280L may also be configured to automatically adjust a white balance during photographing. The ambient light sensor 280L may also cooperate with the optical proximity sensor 280G to detect whether the electronic device 200 is in a pocket, to avoid an accidental touch.

The fingerprint sensor 280H is configured to collect a fingerprint. The electronic device 200 may use a feature of the collected fingerprint to implement fingerprint unlocking, application lock access, fingerprint photographing, fingerprint call answering, and the like.

The temperature sensor 280J is configured to detect a temperature. In some embodiments, the electronic device 200 executes a temperature processing policy based on the temperature detected by the temperature sensor 280J. For example, when the temperature reported by the temperature sensor 280J exceeds a threshold, the electronic device 200 lowers performance of a processor near the temperature sensor 280J, to reduce power consumption and implement thermal protection. In some other embodiments, when the temperature is less than another threshold, the electronic device 200 heats the battery 242 to prevent the electronic device 200 from being shut down abnormally due to a low temperature. In some other embodiments, when the temperature is less than still another threshold, the electronic device 200 boosts an output voltage of the battery 242 to avoid abnormal shutdown due to a low temperature.

The touch sensor 280K is also referred to as a "touch panel". The touch sensor 280K may be disposed on the display 294, and the touch sensor 280K and the display 294 form a touchscreen. The touch sensor 280K is configured to detect a touch operation performed on or near the touch sensor. The touch sensor may transfer the detected touch operation to the application processor to determine a type of a touch event. A visual output related to the touch operation may be provided through the display 294. In some other embodiments, the touch sensor 280K may alternatively be disposed on a surface of the electronic device 200 at a location different from a location of the display 294.

The bone conduction sensor 280M may obtain a vibration signal. In some embodiments, the bone conduction sensor 280M may obtain a vibration signal of a vibration bone of human vocal cords. The bone conduction sensor 280M may also be in contact with a human pulse, and receive a pulse beating signal indicating a blood pressure.

In some embodiments, the bone conduction sensor 280M may alternatively be disposed in the headset, to constitute a bone conduction headset. The audio module 270 may obtain a voice signal through parsing based on a vibration signal that is of the vibration bone of the vocal cords and that is obtained by the bone conduction sensor 280M, to implement a voice function. The application processor may parse heart rate information based on the pulse beating signal indicating a blood pressure obtained by the bone conduction sensor 280M, to implement a heart rate detection function.

The button 290 includes a power button, a volume button, and the like. The button 290 may be a mechanical button. The button 290 may alternatively be a touch button. The electronic device 200 may receive a key input, and generate a key signal input related to user settings and function control of the electronic device 200.

The motor 291 may generate a vibration prompt. The motor 291 may be configured to produce an incoming call vibration prompt and touch vibration feedback. For example, touch operations performed on different applications (for example, photographing and audio playing) may correspond to different vibration feedback effects. For touch operations performed on different areas of the display 294, the motor 291 may also correspond to different vibration feedback effects. Different application scenarios (for example, time reminding, information receiving, an alarm clock, and a game) may also correspond to different vibration feedback effects. A touch vibration feedback effect may be customized.

The indicator 292 may be an indicator light, and may be configured to indicate a charging status and a power change, or may be configured to indicate a message, a missed call, a notification, and the like.

The SIM card interface 295 is configured to connect to a SIM card. The SIM card may be inserted into the SIM card interface 295 or removed from the SIM card interface 295, to contact with or separate from the electronic device 200. The electronic device 200 may support one or N SIM card interfaces, where N is a positive integer greater than 1. The SIM card interface 295 may support a nano-SIM card, a micro-SIM card, a SIM card, and the like. A plurality of cards may be simultaneously inserted into a same SIM card interface 295. The plurality of cards may be of a same type or of different types. Different types of SIM cards are compatible in the SIM card interface 295. The SIM card interface 295 is compatible with an external storage card. The electronic device 200 interacts with a network through the SIM card, to implement functions such as calling and data communication. In some embodiments, the electronic device 200 uses an eSIM, that is, an embedded SIM card. The eSIM card may be embedded into the electronic device 200, and cannot be separated from the electronic device 200.

In embodiments of this application, a specific structure of an execution body of a multi-device collaboration method is not particularly limited in the embodiments of this application, provided that a program in which code of the multi-device collaboration method provided in the embodiments of this application is recorded may be run to perform communication according to the multi-device collaboration method provided in the embodiments of this application. For example, the execution body of the multi-device collaboration method provided in the embodiments of this application may be a function module that is in a first device and that can invoke a program and execute the program, or may be a communications apparatus, for example, a chip, applied to the first device.

Figure 3:
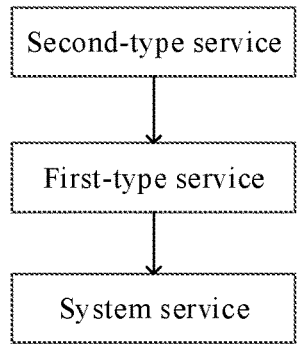
FIG. 3 is a schematic diagram of a software system architecture of an electronic device according to an embodiment of this application.

A distributed system needs to be run in each electronic device that implements the multi-device collaboration method described above. Refer to FIG. 3. FIG. 3 shows a distributed system run in each device in a multi-device collaboration method according to an embodiment of this application. There is an underlying system service in the distributed system. The distributed system supports a developer in developing, based on an application scenario, an atomic service, for example, a first-type service located at an upper layer of a system service or a second-type service located at an upper layer of the first-type service that are in the figure. Each atomic service completes a single service, and each atomic service may be downloaded, installed, and run independently. For example, the developer develops a plurality of atomic services based on the application scenario. Some atomic services are installed in a mobile phone, some atomic services are installed in a large-screen device, and some atomic services are installed on a smart speaker. There are message synchronization and communication mechanisms for these atomic services based on the underlying system service. For example, a second-type service in one device may call a first-type service in another device by using a distributed soft bus in the system service. For ease of description, collaboration between devices is subsequently described from an atomic service level, and a description of an intermediate bridge of the system service is omitted. For example, a subsequent description in which an atomic service in one device calls an atomic service in another device actually indicates that an atomic service in one device calls an atomic service in another device by using the distributed soft bus in the system service.

The first-type service is an AA (Atomic Ability) service. The AA service has no interface display function, has a dependency on the system service, and is a program entity for implementing a single function. The second-type service is an FA (Feature Ability) service. The FA service has an interface display function, and can call an AA service in a current device or another device.

Figure 4:
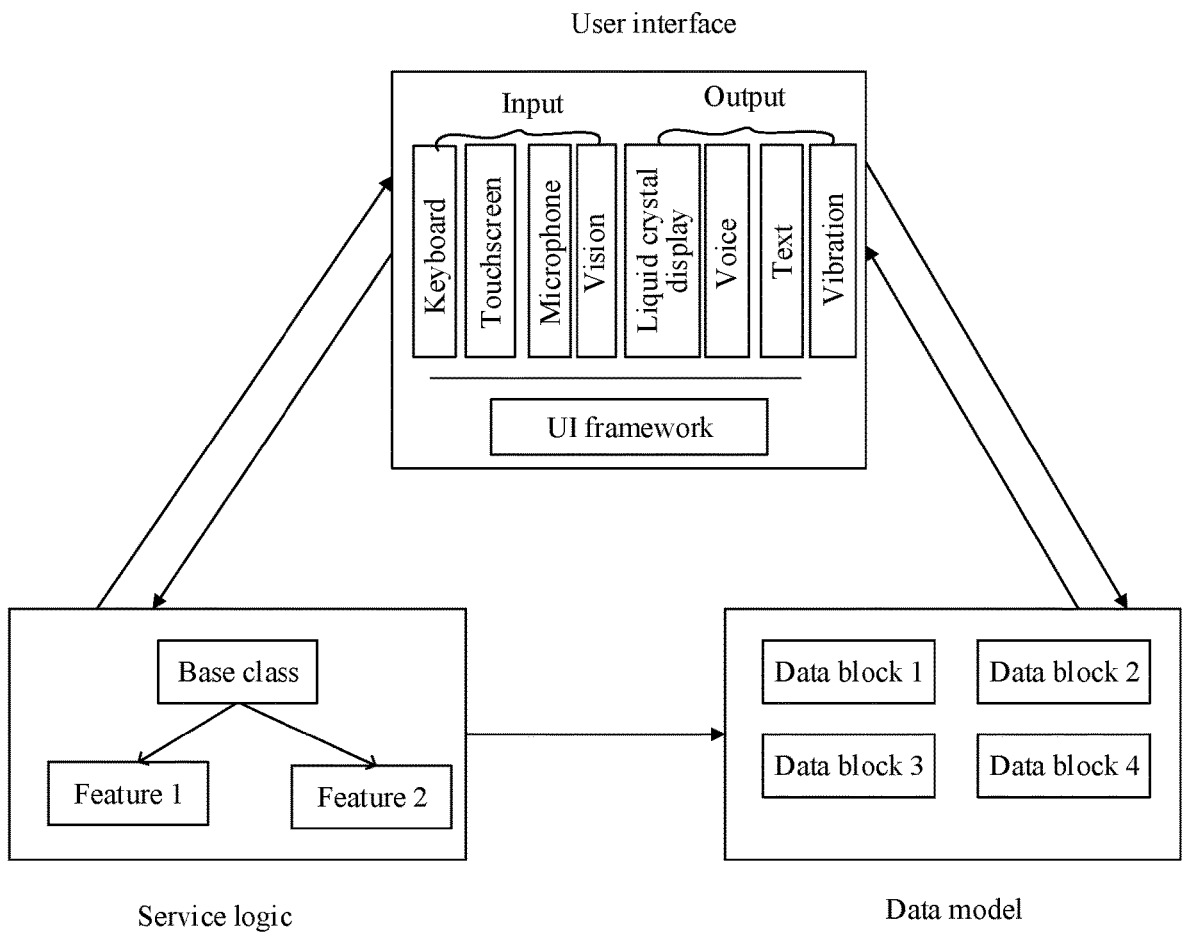
FIG. 4 is a schematic diagram of an architecture of a second-type service according to the embodiment shown in FIG. 3.

To facilitate a clearer understanding of the FA service and the AA service, FIG. 4 is used to describe the FA service by using an example. As shown in FIG. 4, in the FA service, a user interface, service logic, and a data model are separated from each other. There is a UI (User Interface) framework in the user interface. The UI framework supports on-demand tailoring and separation, and supports multi-mode input and output. For example, the input may include a keyboard, a touchscreen, a microphone, and vision, and the output may include a liquid crystal display, a voice, a text, and vibration. In actual application, an appropriate output is selected based on a device form and a user scenario. The service logic also supports multi-device deployment and differentiated tailoring. In other words, different devices may have different logic forms. The data model has an automatic synchronization mechanism, and can provide automatic data persistence and automatic recovery mechanisms. For example, when data is shared and migrated between different devices, user data that needs to be synchronized and user data that does not need to be synchronized may be marked; during migration, user data related to a running status (for example, playback progress and a playback volume) is persisted to protect the data from being lost; and after migration, the running status is restored based on the persistent data. Therefore, data between a plurality of devices in which distributed systems are run can be automatically synchronized.

It may be understood from the description of the distributed system that, according to the distributed system provided in this embodiment of this application, the plurality of devices in which the distributed systems are run implement collaboration at a system level, and have good compatibilities. In this way, a problem of poor compatibility caused when one device sends signaling of a proprietary protocol to another device to implement control on the another device by the one device is resolved. In addition, although a plurality of devices are required in the multi-device collaboration method provided in this embodiment of this application, there is no need to develop an independent APP for each device, and a developer may develop a set of FA services/AA services, and package the successfully developed FA services/AA services and upload them to an application market. The FA services/AA services are distributed to the appropriate devices through the application market based on information about each device, or a user may proactively download an adapted FA service and/or AA service from each device, thereby improving development efficiency. In addition, because mutual calling may be implemented by using a distributed soft bus between the devices in which the distributed systems are run, and there is a synchronization mechanism for data between the devices, efficiency of data synchronization between the devices in a video teaching process is improved, and transmission delays of various types of data are reduced.

It should be noted that, some devices may have the FA service described above developed for the multi-device collaboration method, and some devices may have the AA service described above developed for the multi-device collaboration method, and some devices may have both the FA service and the AA service developed for the multi-device collaboration method. However, for a device, the AA service corresponding to the multi-device collaboration method provided in this embodiment of this application may not exist, but an AA service corresponding to another function method may exist. For a device, the FA service corresponding to the multi-device collaboration method provided in this embodiment of this application may not exist, but an FA service corresponding to another function method may exist.

For a clearer understanding of the multi-device collaboration method provided in this embodiment of this application, the following separately describes scenarios to which this embodiment of this application may be applied and corresponding examples.

Figure 5:
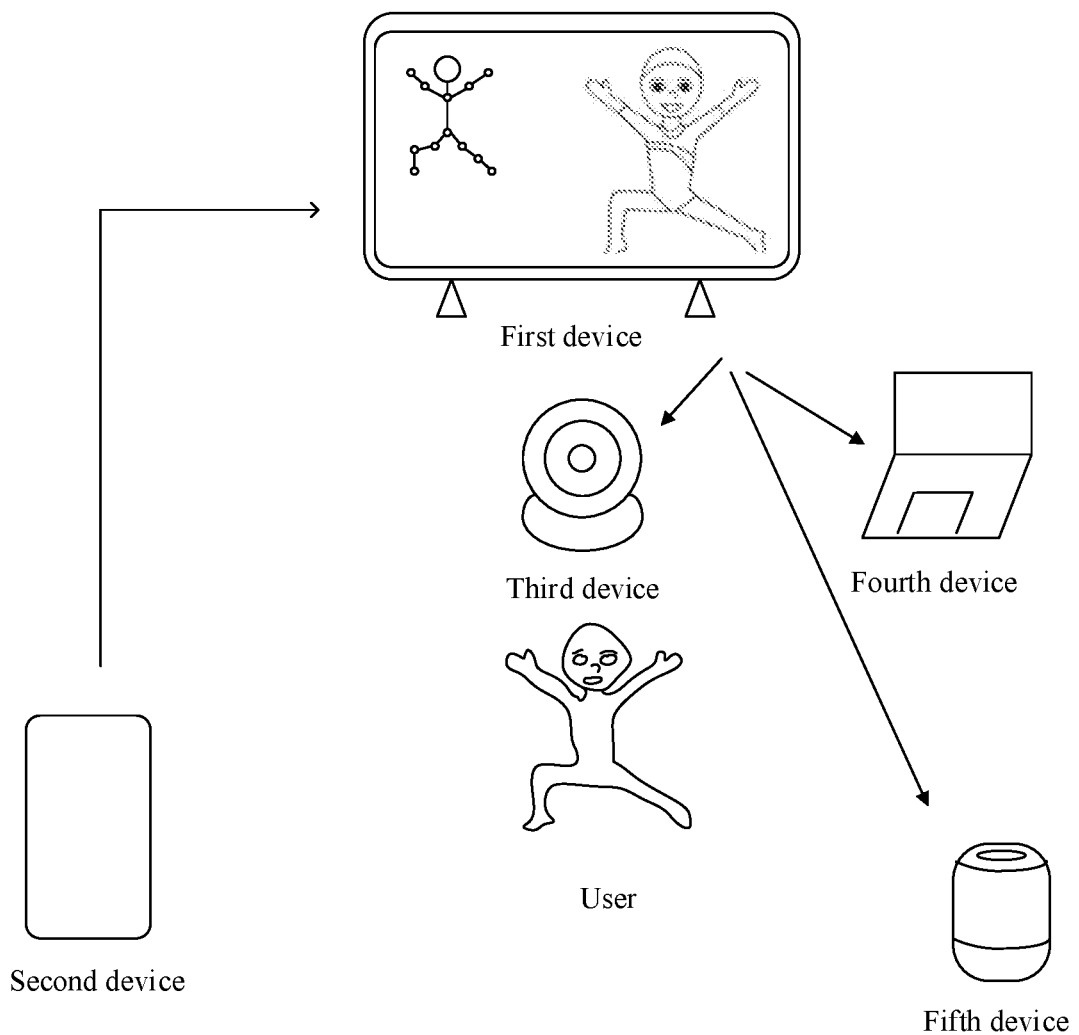
FIG. 5 is a schematic diagram of another application scenario of a multi-device collaboration method according to an embodiment of this application.

FIG. 5 shows an application scenario of a multi-device collaboration method according to an embodiment of this application. In the application scenario, there are a first device, a second device, a third device, a fourth device, and a fifth device. The distributed system described above is run in each of the first device to the fifth device, and the first device to the fifth device are located in a same network. The first device to the fifth device form a multi-device collaboration system to perform the multi-device collaboration method provided in this embodiment of this application, to implement video teaching in which a plurality of devices are used.

The first device may be a device with a video display function, for example, a large-screen device. The second device may be a device with a video display function, for example, a mobile phone. The third device may be a device with a video capture function, for example, a mobile phone provided with a camera apparatus, a large-screen device provided with a camera apparatus, or a camera apparatus. The fourth device may be a device with a video processing capability, for example, a mobile phone, a large-screen device, or a computer. The fifth device may be a device with a voice broadcast function, for example, a mobile phone, a large-screen device, or a smart speaker. It may be understood from the foregoing description that the first device to the fifth device may be different devices. For example, as shown in the figure, the first device is a mobile phone, the second device is a large-screen device, the third device is a camera apparatus, the fourth device is a computer, and the fifth device is a smart speaker. Alternatively, there may be same devices in the first device to the fifth device. For example, in FIG. 1, the third device may be the same as the first device, and is a large-screen device. The fourth device may be the same as the second device, and is a mobile phone.

In actual application, there may be a plurality of third devices, for example, the third devices may be a large-screen device, a mobile phone, and a camera apparatus. There may also be a plurality of fourth devices, for example, the fourth devices may be a large-screen device, a mobile phone, and a computer. Certainly, the examples of the first device, the second device, the third device, the fourth device, and the fifth device are merely used for description, and do not indicate that the first device to the fifth device can only be the electronic devices in the foregoing examples.

In a brief example of the application scenario, a user may download and play a teaching video by using an APP in a mobile phone (the second device in FIG. 5), and the user may choose to synchronize the teaching video played on the mobile phone to a large-screen device (the first device in FIG. 5). The large-screen device plays the teaching video. The user learns an action on site by following the teaching video played by the large-screen device. A camera apparatus (the third device in FIG. 5) captures a user action picture video, and synchronizes the user action picture video to a computer (the fourth device in FIG. 5). The computer analyzes the teaching video and the user action picture video to obtain a comparison analysis result, and synchronizes the comparison analysis result to a smart speaker (the fifth device in FIG. 5). The smart speaker plays the teaching analysis result in a form of voice. The process of analyzing the teaching video and the user action picture video may include: analyzing an image frame in the captured user action picture video. For example, a human body key point technology may be used to determine whether an action of the user in an image frame is standard (for example, determine whether the action of the user is consistent with an action shown in the teaching video).

In addition, it should be noted that the teaching video in the mobile phone is continuously played, and the large-screen device also continuously obtains synchronization data of the teaching video played on the mobile phone, for example, current playback progress. A camera in the large-screen device continuously captures a user action picture video, and the mobile phone also continuously processes partial frames in the teaching video and partial frames in the user action picture video. The smart speaker continuously plays comparison analysis results of the partial frames in the teaching video and the partial frames in the user action picture video. The foregoing processes are simultaneously performed. However, for the partial frames in the teaching video, there is a sequence between steps related to the partial frames.

For example, a specific time interval or a specific quantity of image frames in the teaching video may be used as a demarcation point. For example, at an interval of 1 second (in actual application, another time period may be set, for example, 30 milliseconds, 2 seconds, or 3 seconds), image frames corresponding to the teaching video are used as a first video, and image frames corresponding to a user action picture video corresponding to the interval time are used as a second video. Then, the mobile phone processes the first video and the second video to obtain a comparison analysis result corresponding to the current interval time, and the smart speaker plays the comparison analysis result corresponding to the current interval. Certainly, alternatively, every five image frames (in actual application, another quantity may be set, for example, 10, 15, or 20) in the teaching video may be used as a first video, and a user action picture video captured in a play time period corresponding to the five image frames may be used as a second video. Then, the mobile phone processes the first video and the second video to obtain a comparison analysis result corresponding to the current five image frames or the current play time period, and the smart speaker plays the comparison analysis result. It may be understood that, from a macroscopic perspective, operation processes performed by a plurality of devices are performed simultaneously. From a microscopic perspective, there is a sequence between steps. For example, only after the third device captures some image frames in a user action picture video, the fourth device may process the image frames to obtain a comparison analysis result related to the image frames, and the fifth device may play the comparison analysis result.

It may be understood from the brief example of the foregoing application scenario that, a developer needs to create an FA service (for example, the FA service in the application scenario may include course content, personal information, a historical transcript, and an exercise plan) and an AA service (a video capture service, a video processing service, and a voice broadcast service) based on the application scenario. The FA service supports a mobile phone and a large-screen device. The video capture service supports a camera apparatus. Certainly, in actual application, the video capture service can also support a camera in a mobile phone and a camera in a large-screen device. The video processing service can support the fourth device. Certainly, in actual application, the video processing service can also support a large-screen device and a mobile phone. The voice broadcast service supports a smart speaker. Certainly, in actual application, the voice broadcast service can also support a speaker in a mobile phone and a speaker in a large-screen device. Therefore, according to the foregoing description, a distributed system in a mobile phone includes at least a system service and an FA service, and may further include a video processing service, a video capture service, and the like; a distributed system in a large-screen device includes at least a system service and an FA service, and may further include a video capture service and a video processing service; a distributed system in a camera apparatus includes at least a system service and a video capture service; a distributed system in a notebook computer includes at least a system service and a video processing service; and a distributed system in a smart speaker includes at least a system service and a voice broadcast service.

In a brief example described with reference to an atomic service in a distributed system, for ease of differentiation, an FA service in a first device may be denoted as a first teaching service, and an FA service in a second device may be denoted as a second teaching service. The example is detailed below:

The second teaching service in the second device migrates a teaching video to the first device, the first teaching service in the first device plays a first video synchronized by the second teaching service in the second device, and the first teaching service in the first device calls a video capture service in a third device by using a distributed soft bus; after the third device receives a calling instruction, the video capture service in the third device controls a camera apparatus in the third device to capture a second video of a user, the third device synchronizes the second video to a fourth device, and the first teaching service in the first device calls a video processing service in the fourth device by using the distributed soft bus; after the fourth device receives a calling instruction, the video processing service in the fourth device controls the fourth device to process the first video and the second video, to obtain a comparison analysis result of the first video and the second video; the fourth device synchronizes the comparison analysis result to a fifth device, and the first teaching service in the first device calls a voice broadcast service in the fifth device by using the distributed soft bus; and after the fifth device receives a calling instruction, the voice broadcast service in the fifth device controls a speaker in a smart speaker to play the comparison analysis result in a form of voice.

It may be understood that, in actual application, alternatively, the comparison analysis result may not be output in a voice broadcast form but in another manner. For example, the comparison analysis result may be output in a form of graphic. When the comparison result is output in a form of graphic, the first teaching service in the first device may display the comparison analysis result.

In this embodiment of this application, for a process in which the second teaching service in the second device migrates the first video to the first device, there may be the following manners:

In a first manner, the user projects the first video in the second device to the first device for the first time. The first device does not store the first video, the second device sends the first video to the first device, and the second device sends synchronization data of the first video to the first device. The first device plays the first video based on the received first video and the synchronization data of the first video. The synchronization data may include one or more of the following data: playback progress, a playback volume, a playback background color, and a setting of a pop-up screen during playback. Certainly, the synchronization data may further include other data not listed above, and examples are not provided herein one by one.

In a second manner, the user has projected the first video in the second device to the first device before. The first device stores the first video sent by the second device during projection, the second device does not need to send the first video to the first device again, and the second device may send the synchronization data of the first video to the first device.

Because a screen of the second device is relatively small, in a video learning process, it is inconvenient for the user to perform learning by following the first video played by the second device. Therefore, the second teaching service in the second device may synchronize the first video to the second device with a larger screen, and the second teaching service in the second device plays the first video. The user may perform learning by following the first video played by the second device, and capture the second video of the user about on-site learning by using a camera. The fourth device with a video processing capability processes the first video and the second video to obtain the comparison analysis result of the first video and the second video. The comparison analysis result is used to determine whether a learning action of the user is standard and prompt the user how to correct the non-standard action. The comparison analysis result is played by using the speaker in the fifth device, so that the user can watch the teaching video to perform learning and can also listen to the comparison analysis result, thereby achieving a good learning effect.

Figure 6:
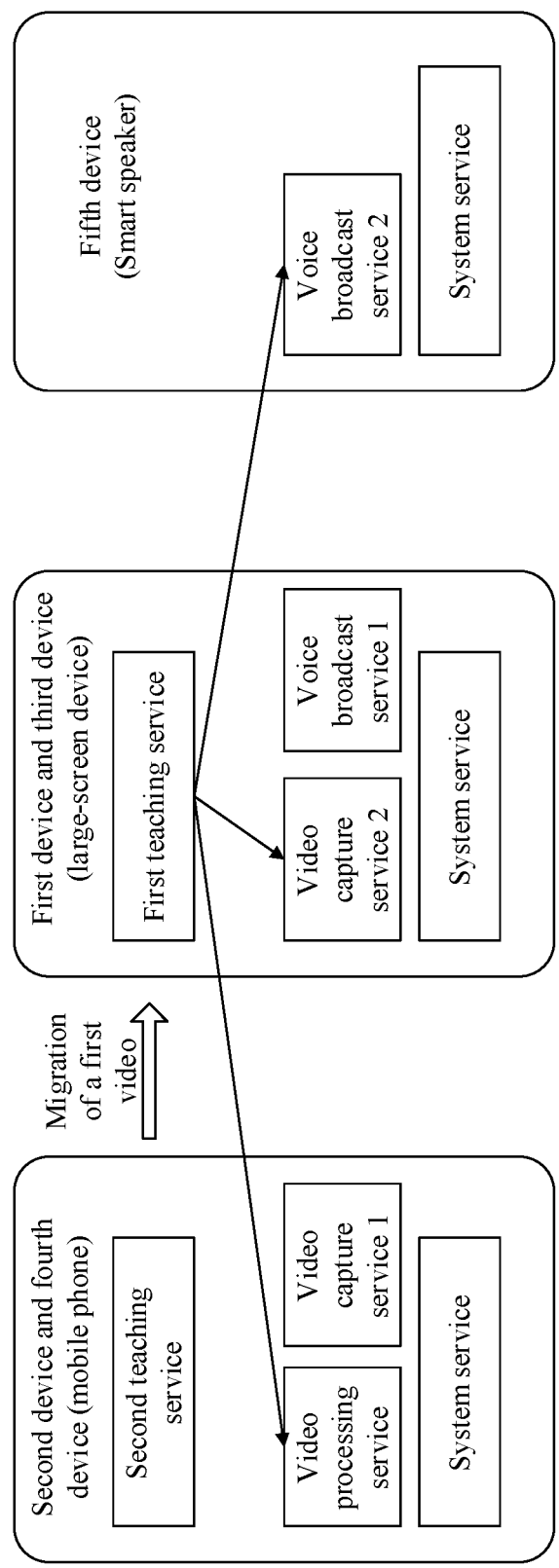
FIG. 6 is an example diagram of the multi-device collaboration method indicated by the application scenario shown in FIG. 5.

Refer to FIG. 6. FIG. 6 shows another example of the multi-device collaboration method indicated by the application scenario shown in FIG. 5. In this example, the third device and the first device are a same device, for example, a large-screen device with a camera apparatus in the figure. The fourth device and the second device are a same device, for example, a mobile phone with a video processing capability in the figure. The fifth device is a smart speaker.

In this example, a distributed system run in the first device includes a system service, a video capture service 2 and a voice broadcast service 1 located at an upper layer of the system service, and a first teaching service located at upper layers of the video capture service 2 and the voice broadcast service 1; a distributed system run in the second device includes a system service, a video processing service and a video capture service 1 located at an upper layer of the system service, and a second teaching service located at upper layers of the video processing service and the video capture service 1; and a distributed system run in the fifth device includes a system service and a voice broadcast service 2 located at an upper layer of the system service. The second device migrates a first video to the first teaching service in the first device through the second teaching service. The first teaching service in the first device calls the video capture service 2 in the first device, and the video capture service 2 in the first device controls a camera apparatus in the first device to capture a second video (a user action picture video). The first teaching service in the first device further calls the video processing service in the second device, and the video processing service in the second device controls a processor in the second device to process the first video and the second video to obtain a comparison analysis result of the first video and the second video. The first teaching service in the first device further calls the voice broadcast service 2 in the fifth device, and the voice broadcast service 2 in the fifth device controls a speaker in the fifth device to play the comparison analysis result.

Figure 7:
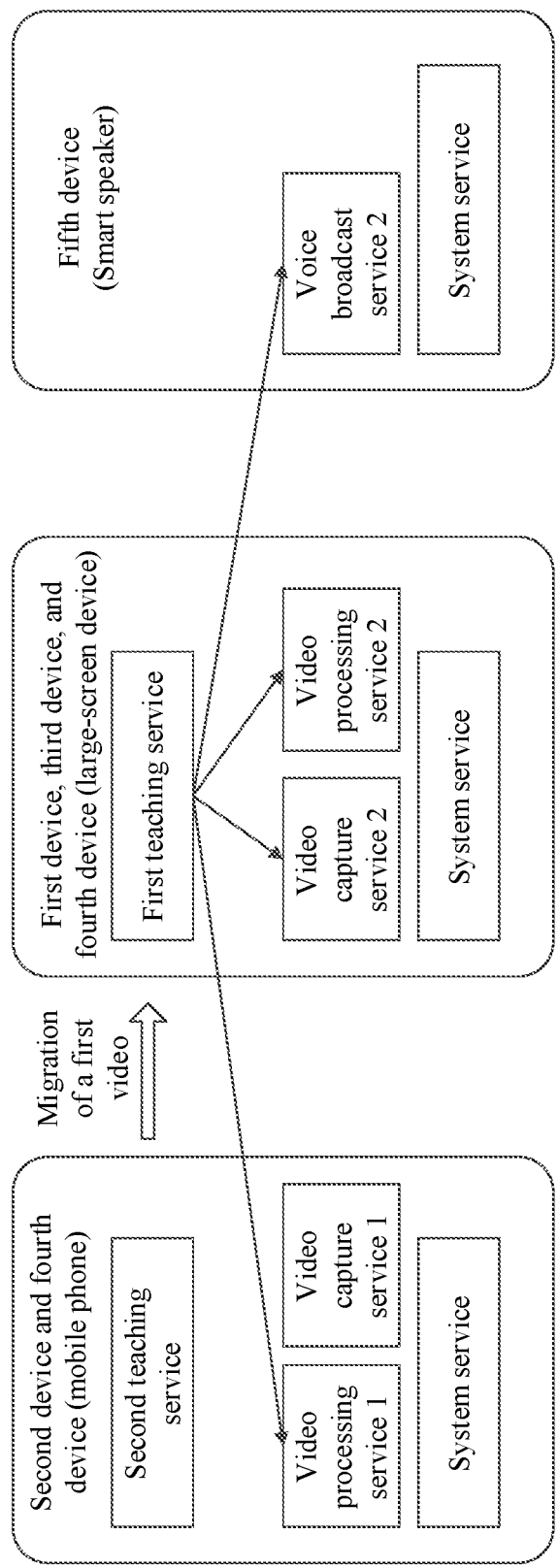
FIG. 7 is another example diagram of the multi-device collaboration method indicated by the application scenario shown in FIG. 5.

Refer to FIG. 7. FIG. 7 shows another example of the multi-device collaboration method indicated by the application scenario shown in FIG. 5. In this example, the third device and the first device are a same device, for example, a large-screen device. There are two fourth devices. One fourth device is a first device, for example, a large-screen device, the other fourth device is a second device, for example, a mobile phone, and the fifth device is a smart speaker.

In this example, a distributed system run in each device is not described again. For details thereof, refer to representation in the accompanying drawings. A difference between this example and the example shown in FIG. 6 lies in that: A first teaching service in the first device may call a video processing service 2 in the first fourth device (the first device), and may also call a video processing service 1 in the second fourth device (the second device). Each of the two fourth devices (the first device and the second device) performs a part of video processing work, to comprehensively utilize a computing capability of each device, thereby increasing a video processing speed and improving video processing efficiency. In this example, for a process in which the first teaching service in the first device calls the video processing services in the plurality of fourth devices to control each of the plurality of fourth devices to perform a part of video processing work, refer to descriptions in subsequent embodiments.

Figure 8:
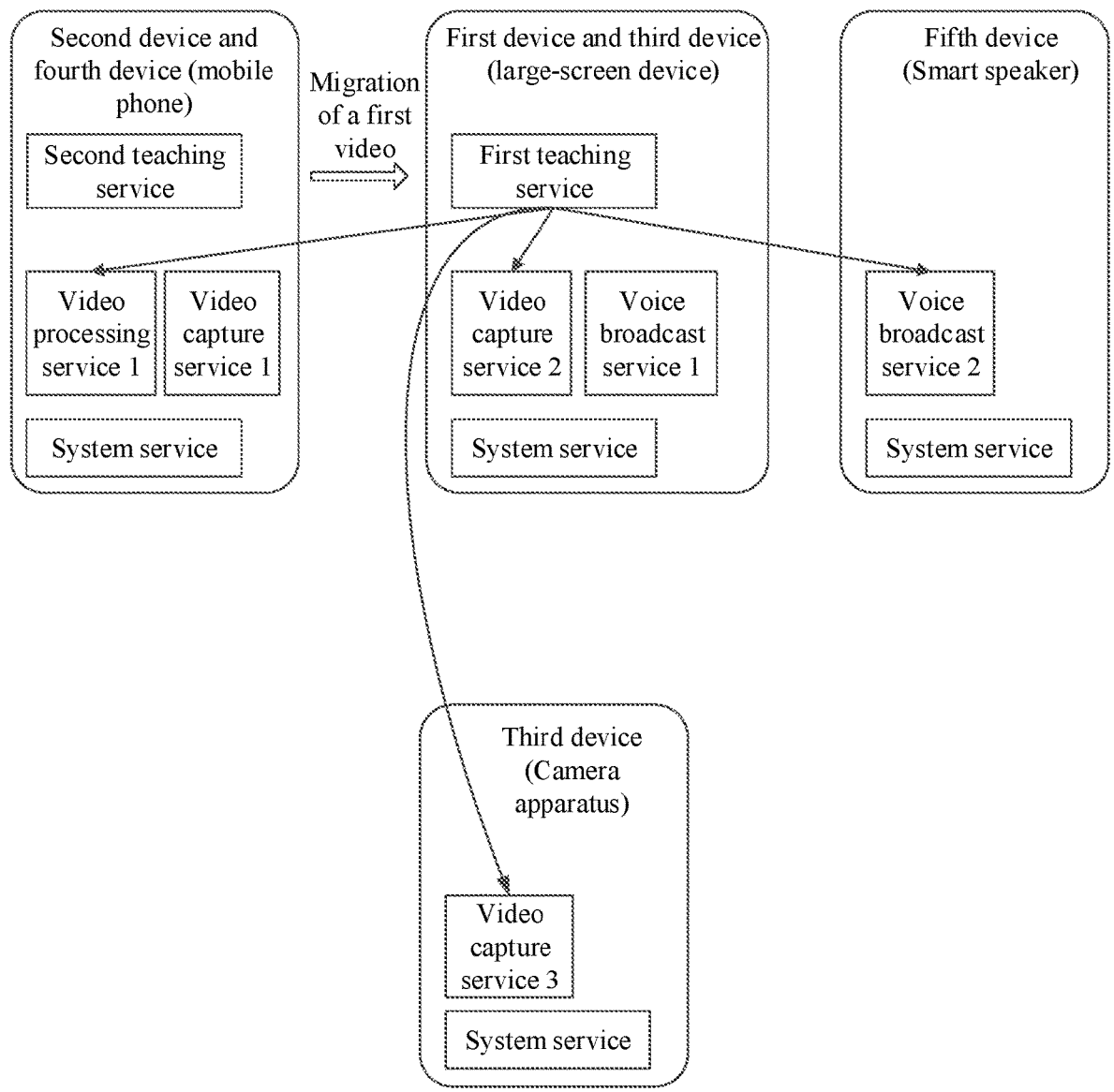
FIG. 8 is another example diagram of the multi-device collaboration method indicated by the application scenario shown in FIG. 5.

Refer to FIG. 8. FIG. 8 shows another example of the multi-device collaboration method indicated by the application scenario shown in FIG. 5. In this example, there are two third devices: a first device (a large-screen device in the figure) and a camera apparatus. The fourth device and the second device are a same device, for example, a mobile phone in the figure, and the fifth device is a smart speaker.

In this example, a distributed system run in each device is not described again. For details thereof, refer to representation in the accompanying drawings. A first teaching service in the first device may call a video capture service 2 in the $1^{st}$ third device (the first device) and a video capture service 3 in the $2^{nd}$ third device (the camera apparatus). In the application scenario, two cameras may simultaneously capture a second video of on-site learning of the user, so that the omnidirectional multi-angle second video of the user can be obtained, and three-dimensional composition can also be performed based on the omnidirectional multi-angle second video, to obtain a more accurate comparison analysis result. In this way, the user can obtain accurate teaching guidance.

Certainly, in actual application, the first teaching service in the first device may also call a video capture service 1 in a $3^{rd}$ third device (the second device), and the first teaching service in the first device may also call only a video capture service 3 in the camera apparatus.

In another example of the application scenario shown in FIG. 5, a sixth device may also exist. The first device to the sixth device form a multi-device collaboration system to perform the multi-device collaboration method provided in this embodiment of this application. The sixth device may be a sports watch, and the sports watch has a function of acquiring motion data of a user. To be specific, a distributed system run in the sixth device includes a system service and a motion data acquisition service located at an upper layer of the system service. The motion data acquisition service belongs to a first-type service. The sixth device may acquire motion data of the user obtained during motion, for example, data such as a heart rate of the user and calories consumed by the user. A first teaching service in the first device may call the motion data acquisition service in the sixth device by using a distributed bus, to control the sixth device to acquire motion data of the user, and control the sixth device to synchronize the acquired motion data to the first device. The first teaching service in the first device may display the motion data of the user. Certainly, in actual application, a data acquisition apparatus in the sixth device acquires motion data of the user before being called. After the motion data acquisition service in the sixth device is called, the sixth device synchronizes the acquired historical motion data and/or real-time motion data to the second device.

Figure 9:
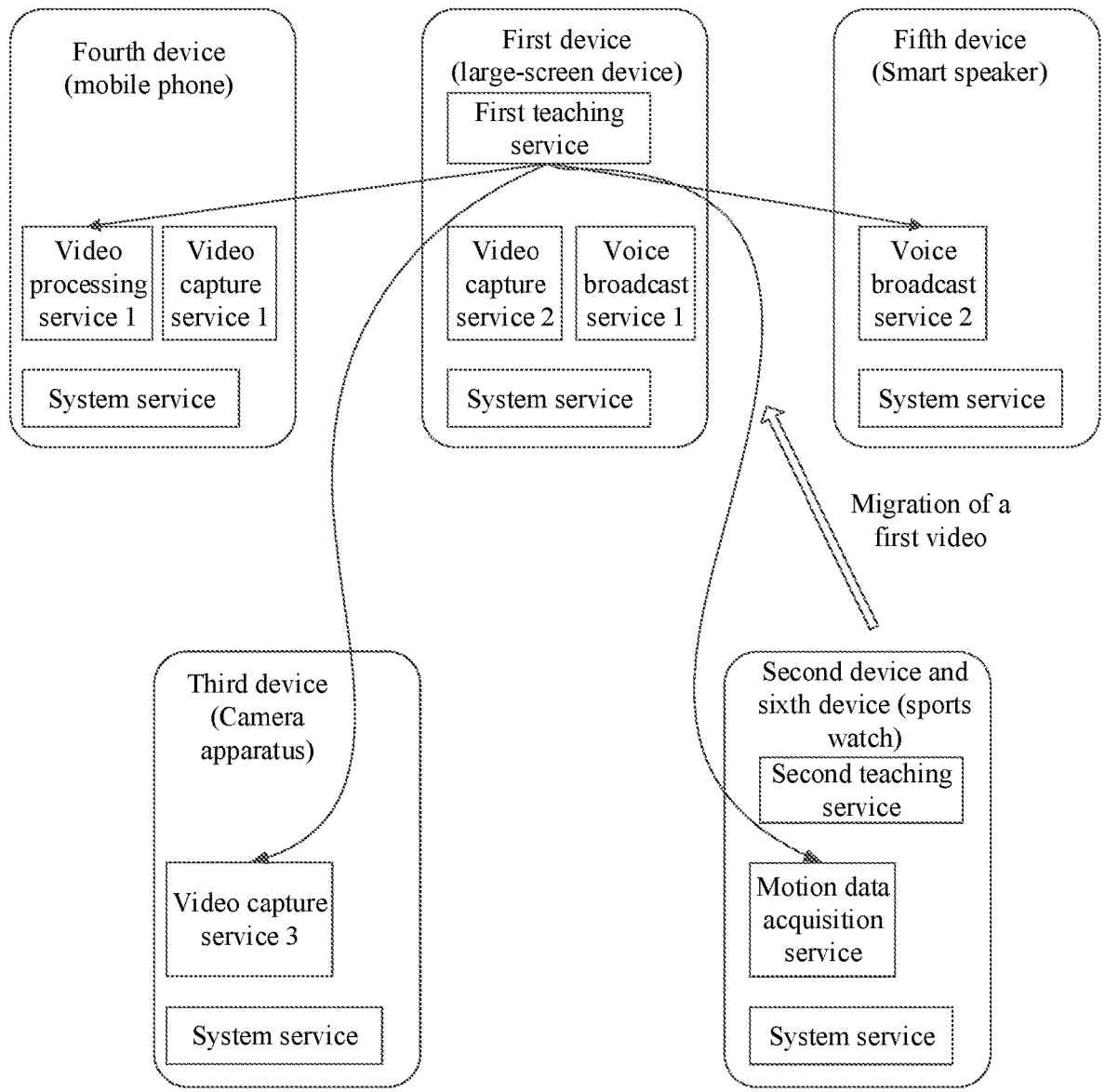
FIG. 9 is another example diagram of the multi-device collaboration method indicated by the application scenario shown in FIG. 5.

Refer to FIG. 9. FIG. 9 shows an example of another application scenario of the multi-device collaboration method according to this embodiment of this application. In this example, a first device is a large-screen device; a second device and a sixth device are a same device, for example, a sports watch; a distributed system run in the sixth device includes a system service, a motion data acquisition service located at an upper layer of the system service, and a second teaching service located at an upper layer of the motion data acquisition service; and a third device is a camera apparatus, a fourth device is a mobile phone, and a fifth device is a smart speaker.

In this example, the second teaching service in the second device (a smartwatch) synchronizes a first video to a first teaching service in the large-screen device, and the first teaching service in the large-screen device calls a video capture service 3 in the camera apparatus to capture a second video, . . . , and subsequent steps are not described. For details, refer to the description of any one of the foregoing examples.

In this example, the mobile phone is no longer used as an entrance for video teaching, but a side of the sports watch is used as an entrance for video teaching to initiate migration of the first video, to avoid control centered on the mobile phone.

Figure 10A:
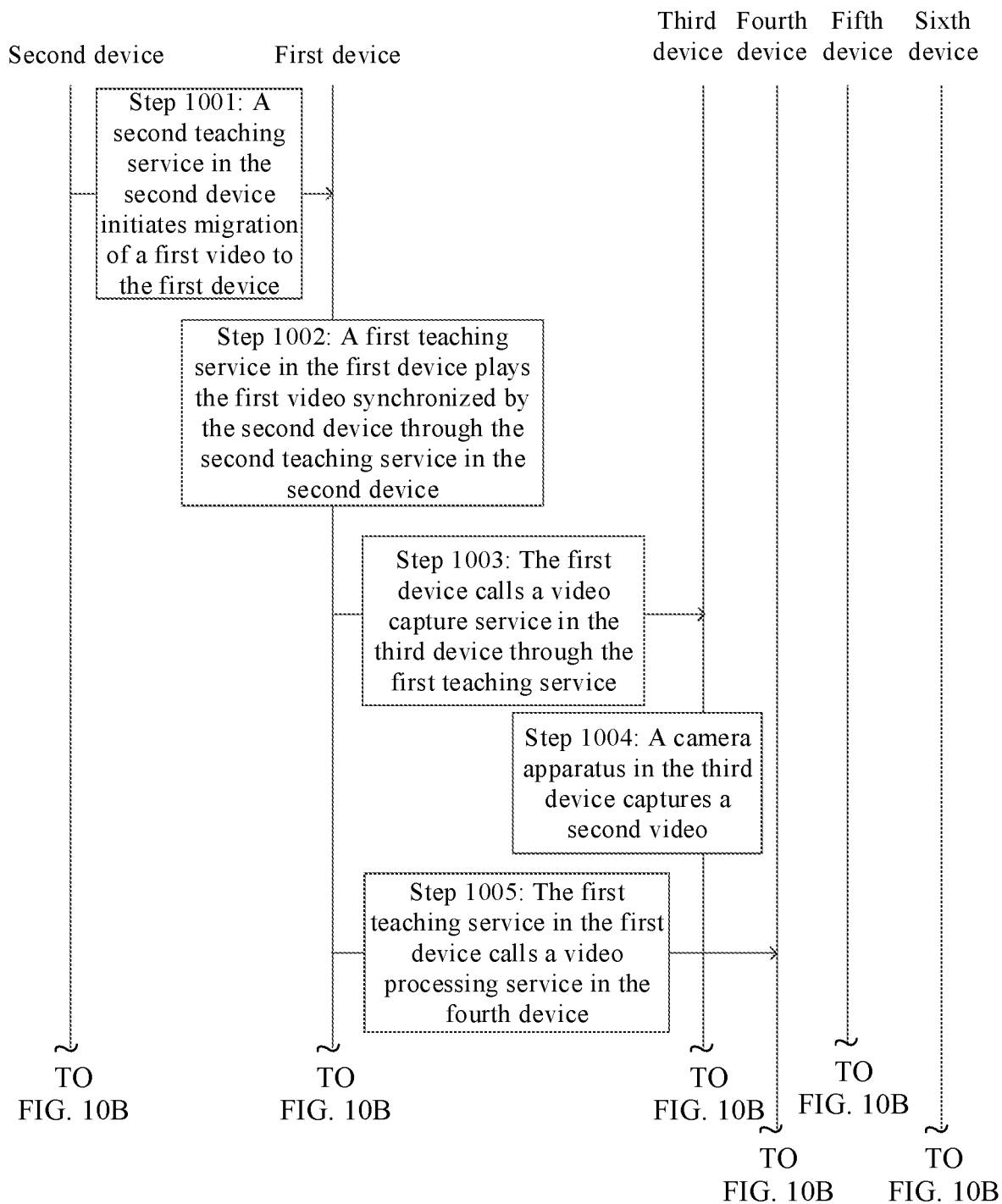
FIG. 10A and FIG. 10B are a schematic flowchart of a multi-device collaboration method according to an embodiment of this application.
Figure 10B:
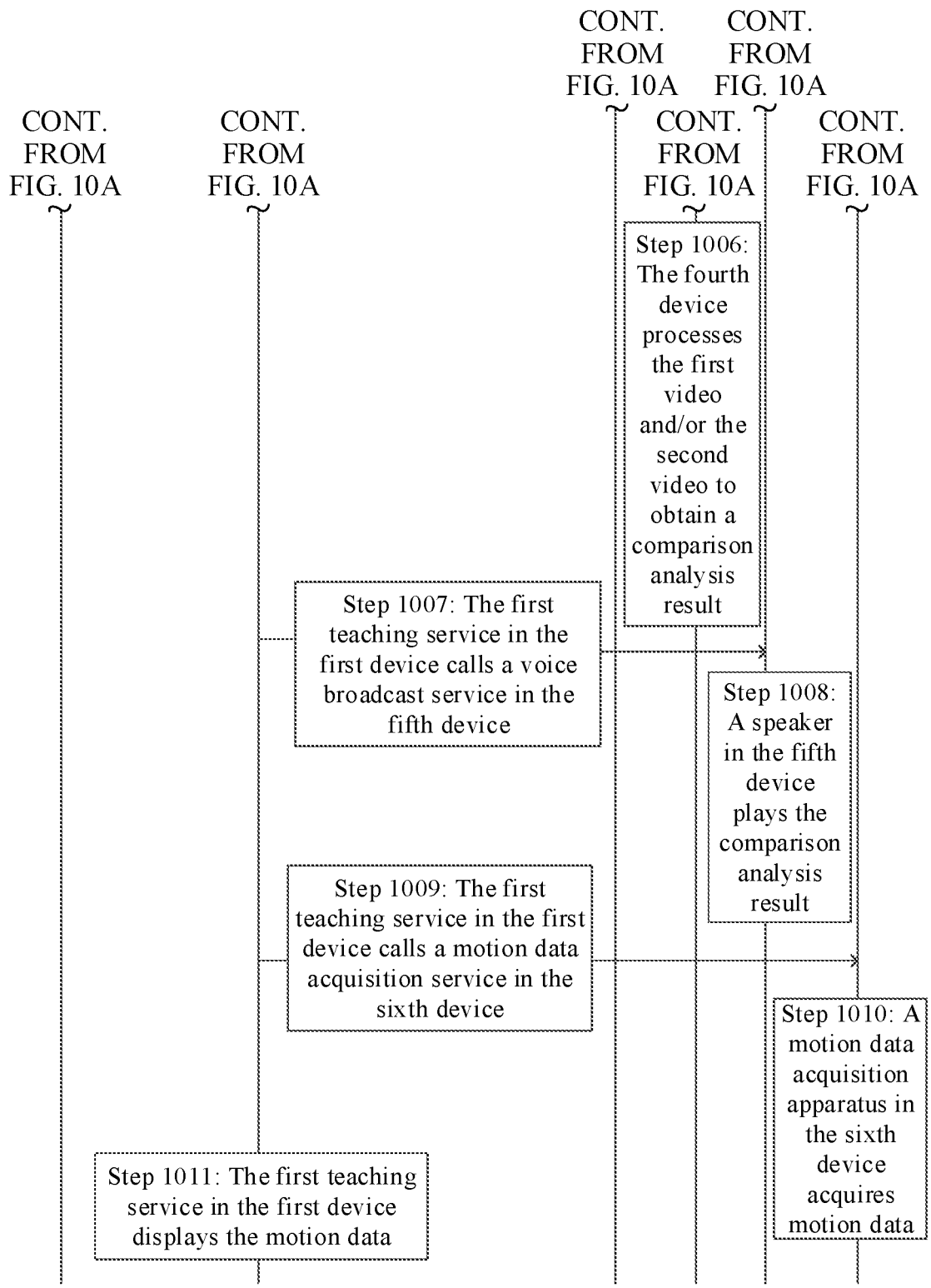

After the plurality of application scenarios and corresponding examples of the multi-device collaboration method provided in this embodiment of this application are described, specific implementations of the multi-device collaboration method indicated by the foregoing application scenarios are described. FIG. 10A and FIG. 10B are a schematic flowchart of a multi-device collaboration method according to an embodiment of this application. As shown in the figure, the method includes the following steps:

Step 1001: A second device initiates migration of a first video to a first device through a second teaching service in the second device.

Step 1002: The first device plays, through a first teaching service, the first video synchronized by the second device through the second teaching service in the second device.

In this embodiment, because a display of the second device is relatively small, it is inconvenient for a user to perform learning by following the first video played by the first device. Therefore, the second device needs to synchronize the first video to another device with a larger screen, for example, a device with a larger display. However, there may be a plurality of devices with a larger display in a network in which the second device is located. Therefore, the second device needs to determine the first device from the plurality of devices with a display. A process in which the second device determines the first device is implemented in the following manner:

The second device obtains information about each device in a target network, where the target network is a network in which the second device is located; the second device determines at least one first candidate device based on the information about each device in the target network, where the at least one first candidate device is a device with a video playing function in the target network; and the second device determines the first device from the at least one first candidate device.

The second device first obtains the information about each device in the target network. For example, the second device is a first mobile phone. In addition to the first mobile phone, there are a large-screen device, a smart speaker, an air conditioner, a camera apparatus, a second mobile phone, a sports watch, a computer, and the like. The first mobile phone may obtain the information about each device in the target network, and the obtained information about the device includes a device type of the device (for example, the device type may be a speaker, a mobile phone, a computer, or an air conditioner) and a function (for example, a video capture function, a video processing function, or a voice broadcast function) that can be supported by the device. The second device may determine, based on the information about each device in the target network, the at least one first candidate device with a video playing function.

In another embodiment of this application, that the second device determines the first device from the at least one first candidate device includes the following:

In a first manner, the second device determines one device with a highest video playing priority in the at least one first candidate device, as the first device.

In this manner, video playing priorities may be preset. For example, video playing priorities are: first large-screen device>second large-screen device>computer>first mobile phone>second mobile phone>sports watch. In this case, the second device may determine the first large-screen device as the first device.

In a second manner, the second device displays information about the at least one first candidate device through the second teaching service, to indicate the user to select one or more devices based on the displayed information about the at least one first candidate device.

The second device determines the selected one or more devices as the first device.

In this manner, the second device displays information about all first candidate devices through the second teaching service in the second device. For example, the second device may display a name of each first candidate device, or may display a function that can be supported by each first candidate device. The user may select one or more devices from the at least one first candidate device as the first device based on the information about the at least one first candidate device displayed on the display of the second device.

In another embodiment of this application, after determining the first device, the second device further needs to determine whether the first device has a first teaching service. The second device can migrate the first video to the first device only when the first device has the first teaching service.

For the first device, there are the following cases:

Case 1: The first device does not have a first teaching service.

Case 2: The first device has a first teaching service.

Figure 11:
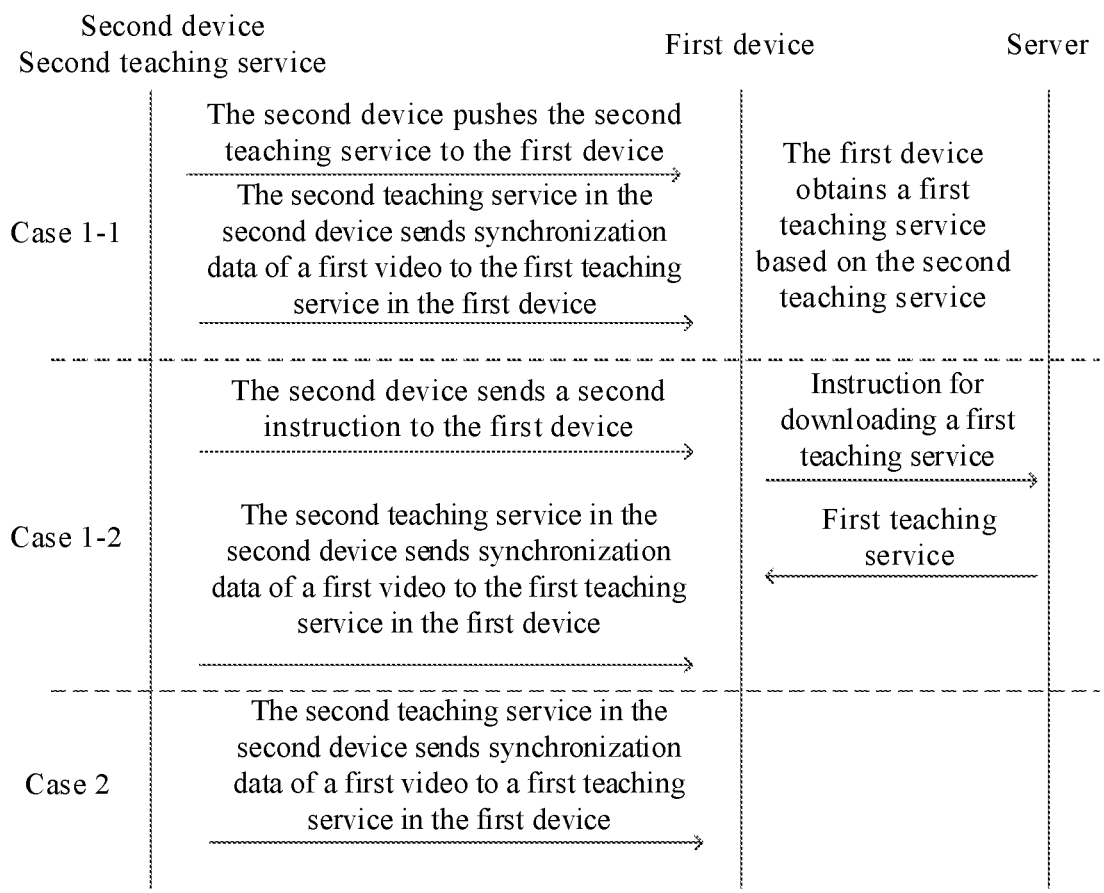
FIG. 11 is a schematic diagram of comparison between three manners of migrating a first video to a first device by a second device according to an embodiment of this application.

Corresponding to Case 1 and Case 2 for the first device, refer to FIG. 11. FIG. 11 is a schematic diagram of a process in which the second device migrates the first video to the first device. As shown in the figure, for steps performed by the second device, there are the following several cases:

Case 1-1: When the first device does not have a first teaching service, the second device pushes the second teaching service to the first device, where the second teaching service is used to indicate the first device to obtain, based on the second teaching service, a first teaching service adapted to the first device; and the second device sends synchronization data of the first video to the first teaching service in the first device through the second teaching service.

Case 1-2: When the first device does not have a first teaching service, the second device sends a second instruction to the first device, where the second instruction is used to instruct the first device to download a first teaching service adapted to the first device; and the second device sends synchronization data of the first video to the first teaching service in the first device through the second teaching service.

Case 2: When the first device has a first teaching service, the second device sends synchronization data of the first video to the first teaching service in the first device through the second teaching service.

For the first device, execution steps corresponding to Case 1-1 for the second device are as follows:

After receiving the second teaching service sent by the second device, the first device obtains, based on the second teaching service, the first teaching service adapted to the first device; the first device receives, through the first teaching service, the synchronization data of the first video sent by the second teaching service in the second device; and the first device plays the first video based on the synchronization data through the first teaching service.

For the first device, execution steps corresponding to Case 1-2 for the second device are as follows:

After receiving the second instruction sent by the second device, the first device downloads the first teaching service adapted to the first device; the first device receives, through the first teaching service, the synchronization data of the first video sent by the second teaching service in the second device; and the first device plays the first video based on the synchronization data through the first teaching service. For example, the first device may download, from a server by using an application market in the first device as an entrance, the first teaching service adapted to the first device. Alternatively, an address link of a server may be stored in the first device, and the first device may download, from the server by using the stored address link as an entrance, the first teaching service adapted to the first device.

For the first device, an execution step corresponding to Case 2 for the second device are as follows:

After receiving the synchronization data of the first video through the first teaching service, the first device plays the first video based on the synchronization data through the first teaching service.

It may be understood from the foregoing description that the second device may indicate, by pushing the second teaching service or sending a download instruction, the first device to deploy the first teaching service.

Step 1003: The first device calls a video capture service in a third device through the first teaching service, where the video capture service is used to control a camera apparatus in the third device to capture a second video.

Step 1004: The third device controls, through the video capture service in the third device, the camera apparatus in the third device to capture the second video.

In this embodiment of this application, before the first device calls the video capture service in the third device through the first teaching service in the first device, the first device further needs to determine the third device. For a process in which the first device determines the third device, there may be the following manner:

the first device obtains information about each device in a target network, where the target network is a network in which the first device is located;

the first device determines at least one third candidate device based on the information about each device in the target network, where the at least one third candidate device is a device with a video capture function in the target network; and the first device determines the third device from the at least one third candidate device.

In another embodiment of this application, that the first device determines the third device from the at least one third candidate device includes the following:

In a first manner, the first device determines one or more devices with a highest video capture priority that are in the at least one third candidate device, as the third device.

In a second manner, the first device displays information about the at least one third candidate device through the first teaching service, to indicate the user to select one or more devices based on the displayed information about the at least one third candidate device; and the first device determines the selected one or more devices as the third device.

It may be understood that the first device may determine one or more third devices from the at least one third candidate device in at least two manners. The third device may be determined by using a preset video capture priority, and user participation is not required in a process in which the first device determines the third device, thereby improving user experience. Alternatively, the information about the at least one third candidate device may be displayed on the first device, and the user selects one or more of the at least one third candidate device as the third device, thereby improving flexibility of a video teaching process.

In another embodiment of this application, after determining the third device, the first device further needs to determine whether the third device has a video capture service; and when the third device does not have a video capture service, the following two manners are used to make the third device have a video capture service. For example, the details are as follows.

In a first manner, when the third device does not have a video capture service, the first device sends a first instruction to the third device, where the first instruction is used to instruct the third device to download a video capture service adapted to the third device.

In a second manner, when the third device does not have a video capture service, the first device sends a video capture service in the first device to the third device, where the video capture service in the first device is used to indicate the third device to obtain, based on the video capture service in the first device, a video capture service adapted to the third device.

For the third device, corresponding to the first manner, after the third device receives the first instruction, the third device downloads the video capture service adapted to the third device. For a manner in which the third device downloads the video capture service, refer to the foregoing manner in which the first device downloads the first teaching service. Details are not described herein again.

For the third device, corresponding to the second manner, after the third device receives the video capture service sent by the first device, the third device obtains, based on the video capture service sent by the first device, the video capture service adapted to the third device.

After first-type services and second-type services for implementing video teaching are developed for a plurality of devices, another device in a same network as the first device may not have a first-type service and/or a second-type service. A first-type service and a second-type service in a distributed system provided in this application do not need to be independently developed for each device. Instead, one device may push the first-type service or the second-type service to another device, so that the another device has the first-type service or the second-type service. Alternatively, one device may send a download instruction to another device, so that the another device can download the first-type service or the second-type service, without requiring the user to download and install a corresponding atomic service on the another device in advance. This improves user experience, and improves flexibility of a multi-device collaboration-based video teaching process.

In this embodiment of this application, a process in which the first device calls the video capture service in the third device is similar to a process in which the second device migrates the first video to the first device. In each of both processes, a device that is in a network and that can be used for a current service needs to be first discovered; and after a third device for the current service is determined, if there is no current service in the third device, the third device further needs to deploy the current service by pushing the current service or sending a download instruction.

Step 1005: The first device calls a video processing service in a fourth device through the first teaching service, where the video processing service is used to control the fourth device to process the first video and the second video, to obtain a comparison analysis result of the first video and the second video.

Step 1006: The fourth device controls, through the video processing service in the fourth device, the fourth device to process the first video and/or the second video, to obtain the comparison analysis result of the first video and the second video.

Step 1007: The first device calls a voice broadcast service in a fifth device through the first teaching service, where the voice broadcast service is used to control a speaker in the fifth device to play the comparison analysis result.

Step 1008: The fifth device controls, through the voice broadcast service in the fifth device, the speaker in the fifth device to play the comparison analysis result of the first video and the second video.

Step 1009: The first device calls a motion data acquisition service in a sixth device through the first teaching service, where the motion data acquisition service is used to control the sixth device to acquire motion data.

Step 1010: The sixth device controls, through the motion data acquisition service in the sixth device, a motion data acquisition apparatus in the sixth device to acquire the motion data.

Step 1011: The first device displays the motion data through the first teaching service.

In this embodiment, the first teaching service in the first device further needs to call the video processing service in the fourth device, the voice broadcast service in the fifth device, and the motion data acquisition service in the sixth device. For processes in which the first teaching service in the first device calls the video processing service in the fourth device, the voice broadcast service in the fifth device, and the motion data acquisition service in the sixth device, refer to the related descriptions about the process in which the first teaching service in the first device calls the video capture service in the third device. Details are not described herein again.

In addition, for ease of description, any one of the second device, the third device, the fourth device, the fifth device, and the sixth device may be denoted as a collaborating device. Certainly, the collaborating device may alternatively be the first device.

For the collaborating device, after receiving a calling request sent by the first device through the first teaching service in the first device, the collaborating device performs at least one of the following operations:

if the calling request is a request for calling a video capture service, the collaborating device controls, through a video capture service in the collaborating device, a camera apparatus in the collaborating device to capture a second video;

if the calling request is a request for calling a video processing service, the collaborating device controls, through a video processing service in the collaborating device, the collaborating device to process a first video and/or the second video to obtain a comparison analysis result of the first video and the second video, where the first video is a teaching video;

if the calling request is a request for calling a voice broadcast service, the collaborating device controls, through a voice broadcast service in the collaborating device, a speaker in the collaborating device to play the comparison analysis result; and if the calling request is a request for calling a video capture service, the collaborating device controls, through a motion data acquisition service in the collaborating device, a motion data acquisition apparatus in the collaborating device to acquire motion data, where the video capture service, the video processing service, the voice broadcast service, and the motion data acquisition service are all first-type services.

In another embodiment of this application, when there are a plurality of fourth devices, that the first device calls the video processing service in the fourth device through the first teaching service in the first device includes:

the first device calls video processing services in at least two fourth devices in a serial manner through the first teaching service, to control the at least two fourth devices to process the first video and/or the second video in a serial manner; and/or the first device calls video processing services in at least two fourth devices in a parallel manner through the first teaching service, to control the at least two fourth devices to process the first video and/or the second video in a parallel manner.

Figure 12:
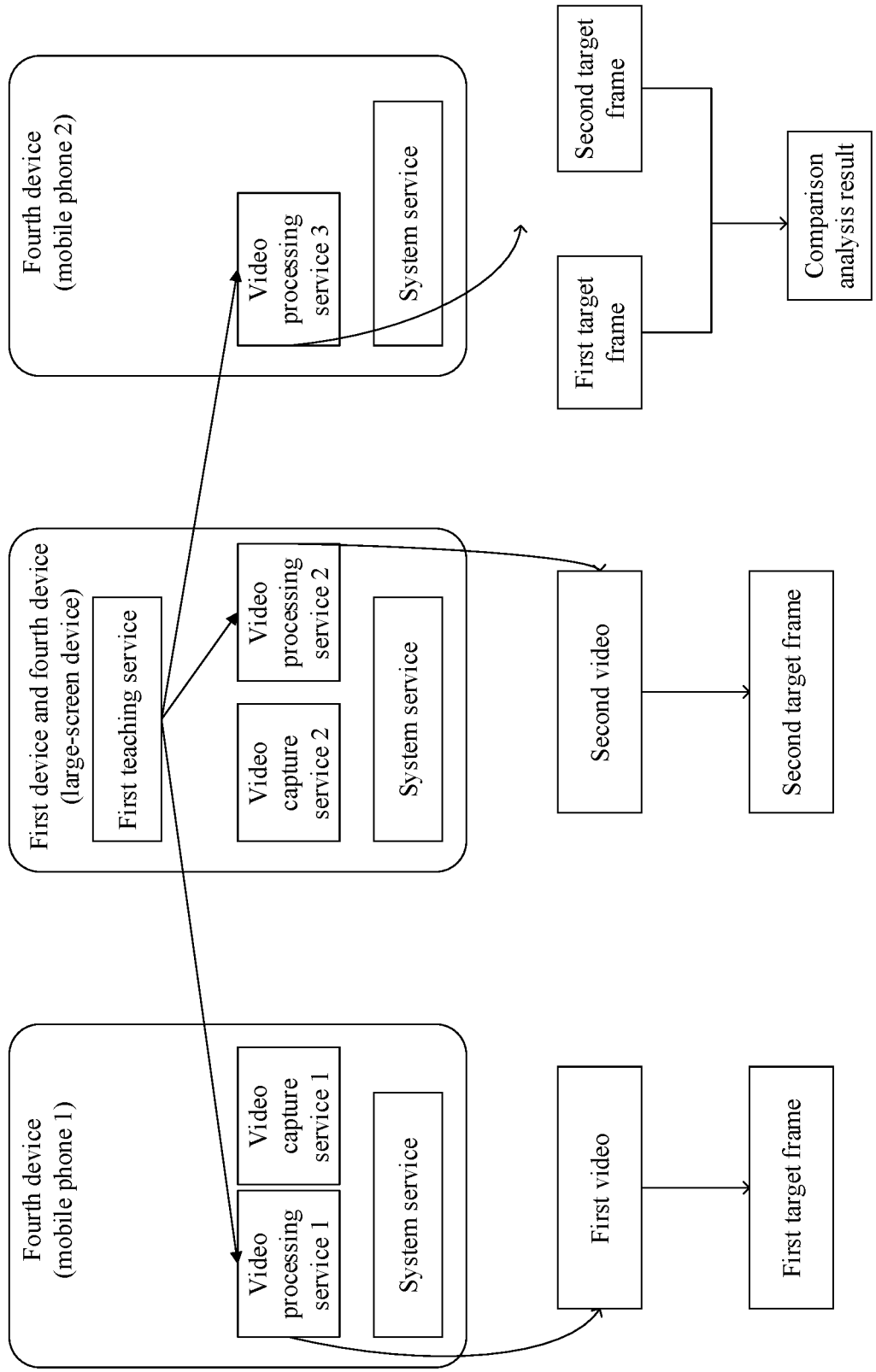
FIG. 12 is a schematic diagram of a process in which a first device calls a video processing service in a fourth device according to an embodiment of this application.

Refer to FIG. 12. FIG. 12 is a schematic diagram of a manner in which a first device calls a fourth device according to an embodiment of this application. As shown in the figure, a first teaching service in the first device (a large-screen device) calls a video processing service 1 in a first fourth device (a mobile phone 1), the first teaching service in the first device (a large-screen device) calls a video processing service 2 in a second fourth device (a large-screen device), and the first teaching service in the first device (a large-screen device) calls a video processing service 3 in a third fourth device (a mobile phone 2).

For example, a process of processing a first video and a second video may be divided into the following steps:

Step A: Identify an image of a person from the first video, and extract a first target frame from the first video, where the first target frame is an image frame including the image of the person.

Step B: Identify an image of the person from the second video, and extract a second target frame from the second video, where the second target frame is an image frame including the image of the person.

Step C: Input the first target frame into a first parallel channel in a convolutional neural network model to obtain a key point in the first target frame.

Step D: Input the second target frame into a second parallel channel in the convolutional neural network model to obtain a key point in the second target frame.

Step E: Input the key point in the first target frame and the key point in the second target frame into a third series channel to obtain a comparison analysis result of the first video and the second video. It should be noted that the first video and the second video do not represent a complete first video and a complete second video, but a picture synchronized by a second device to the first device and a picture captured by a third device in real time in a user learning process.

Step A may be performed on the mobile phone 1, in other words, the video processing service 1 in the mobile phone 1 performs step A.

Step B may be performed on the large-screen device, in other words, the video processing service 2 in the large-screen device performs step B.

Steps C, D, and E may be performed on the mobile phone 2, in other words, the video processing service 3 in the mobile phone 2 performs steps C to E.

It can be learned from the foregoing description that the mobile phone 1 and the large-screen device process the first video and the second video in a parallel manner, the mobile phone 1 and the mobile phone 2 process the first video and the second video in a serial manner, and the large-screen device and the mobile phone 2 process the first video and the second video in a serial manner.

In actual application, the first video and the second video may alternatively be processed in another manner. For example, processing devices in step A, step B, and step E remain unchanged, the first parallel channel in the convolutional neural network model in step C may run in the video processing service 1 in the mobile phone 1, and the second parallel channel in the convolutional neural network model in step D may run in the video processing service 2 in the large-screen device.

In this embodiment, a process of processing the first video and the second video to obtain a comparison analysis result of the first video and the second video may include a plurality of steps. These steps may be performed by a plurality of fourth devices based on internal logic. To be specific, a fourth device may participate in a process of processing only the first video, a fourth device may participate in a process of processing only the second video, and a fourth device may participate in a process of processing the first video and the second video. To be specific, in these steps, steps that may be performed in parallel may be performed by at least two fourth devices in parallel; and in these steps, steps that may be performed in serial may be performed by at least two fourth devices in serial.

It should be noted that, in a manner in which the first device calls the fourth devices, at least two of the fourth devices process the first video and/or the second video in a serial manner, and at least two of the fourth devices process the first video and/or the second video in a parallel manner. In actual application, after the first device calls the fourth devices, all the fourth devices may process the first video and/or the second video in a serial manner, or all the fourth devices may process the first video and/or the second video in a parallel manner.

Certainly, a process of processing the first video and the second video is merely used as an example. In actual application, there may be other processing manners. This is not limited herein.

In this embodiment of this application, the first device may properly allocate computing resources based on computing capabilities of different devices, to increase a video processing speed and improve video processing efficiency.

In this embodiment of this application, if it is not explicitly stated that some steps or operations are implemented through a first-type service or a second-type service, it indicates that the steps or operations may be implemented through the first-type service (the first-type service is implemented based on a system service) or may be implemented through the second-type service (the second-type service is implemented based on a system service). For example, the steps or operations are a step or an operation in which the first device obtains information about each device in a target network and a step or an operation in which the first device determines at least one third candidate device, and other steps are not described one by one.

It should be understood that, in the foregoing embodiment, a description sequence in which the first teaching service in the first device calls first-type services in other devices does not mean an execution sequence, and a sequence between the steps should be determined based on internal logic.

In this embodiment of this application, the first device may be divided into function modules based on the foregoing example of the multi-device collaboration method. For example, the function modules may be obtained through division in correspondence to all functions, or two or more functions may be integrated into one processing module. The integrated module may be implemented in a form of hardware, or may be implemented in a form of a software functional module. It should be noted that, in embodiments of this application, division of the modules is an example and is merely logical function division, and there may be other division in an actual implementation. An example in which the function modules are obtained through division in correspondence to the functions is used for description below.

Figure 13:
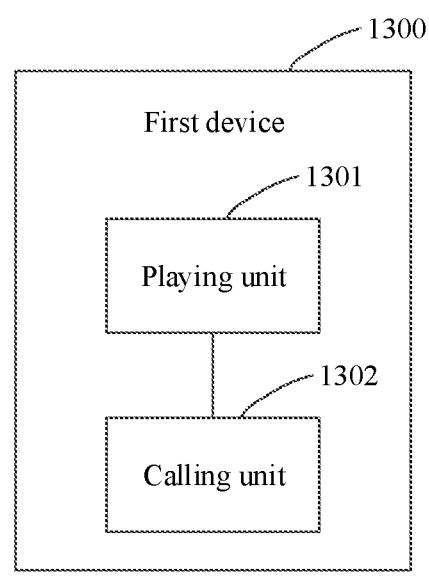
FIG. 13 is a schematic block diagram of a functional architecture module of an electronic device according to an embodiment of this application.

Refer to FIG. 13. The distributed system described above is run in a first device 1300. The first device 1300 includes:
- a playing unit 1301, configured to play a first video synchronized by a second device; and
- a calling unit 1302, configured to call a video capture service in a third device, where the video capture service is used to control a camera apparatus in the third device to capture a second video, where
- the calling unit 1302 is further configured to call a video processing service in a fourth device, where the video processing service is used to control the fourth device to process the first video and the second video, to obtain a comparison analysis result of the first video and the second video; and
- the calling unit 1302 is further configured to call a voice broadcast service in a fifth device, where the voice broadcast service is used to control a speaker in the fifth device to play the comparison analysis result, where
- the video capture service, the video processing service, and the voice broadcast service are all first-type services.

The playing unit 1301 and the calling unit 1302 each may exist in a form of a second-type service.

In another embodiment of this application, the calling unit is further configured to call a motion data acquisition service in a sixth device, where the motion data acquisition service is used to control the sixth device to acquire motion data, and the motion data acquisition service is a first-type service.

In another embodiment of this application, the first device 1300 further includes:
- a device determining unit, configured to: obtain information about each device in a target network, where the target network is a network in which the first device is located; determine at least one third candidate device based on the information about each device in the target network, where the at least one third candidate device is a device with a video capture function in the target network; and determine one or more third devices from the at least one third candidate device.

In another embodiment of this application, the device determining unit is further configured to:
- determine one or more devices with a highest video capture priority that are in the at least one third candidate device, as the third device; or
- display information about the at least one third candidate device to indicate a user to select one or more devices based on the displayed information about the at least one third candidate device; and determine the selected one or more devices as the third device.

The device determining unit may exist in a form of the first-type service and/or the second-type service.

In another embodiment of this application, the first device 1300 further includes:
- a pushing unit, configured to: when the third device does not have a video capture service, send a first instruction to the third device, where the first instruction is used to instruct the third device to download a video capture service adapted to the third device; or when the third device does not have a video capture service, send a video capture service in the first device to the third device, where the video capture service in the first device is used to indicate the third device to obtain, based on the video capture service in the first device, a video capture service adapted to the third device.

The pushing unit may exist in a form of the first-type service.

In another embodiment of this application, the first device 1300 further includes:
- an adaptation unit, configured to: when the first device does not have a first teaching service, obtain a first teaching service adapted to the first device; receive synchronization data of the first video sent by a second teaching service in the second device; and play the first video based on the synchronization data, where
- the adaptation unit is further configured to: when the first device has a first teaching service, play the first video based on synchronization data of the first video after receiving the synchronization data.

In another embodiment of this application, the adaptation unit is further configured to:
- after receiving a second instruction sent by the second device, download the first teaching service adapted to the first device; or
- after receiving the second teaching service sent by the second device, obtain, based on the second teaching service, the first teaching service adapted to the first device.

The adaptation unit may exist in the form of the first-type service and/or the second-type service.

In another embodiment of this application, when there are a plurality of fourth devices, the calling unit 1302 is further configured to:

call video processing services in at least two fourth devices in a serial manner, to control the at least two fourth devices to process the first video and/or the second video in a serial manner; and/or call video processing services in at least two fourth devices in a parallel manner, to control the at least two fourth devices to process the first video and/or the second video in a parallel manner.

The calling unit may exist in the form of the first-type service.

It should be noted that, because content such as information exchange and an execution process between the first device and units is based on a same concept as that in the method embodiments of this application, for details about specific functions of the first device and units and technical effects brought by the first device and units, refer to the method embodiments. Details are not described herein again.

In this embodiment of this application, the collaborating device may be divided into function modules based on the foregoing example of the multi-device collaboration method. For example, the function modules may be obtained through division in correspondence to all functions, or two or more functions may be integrated into one processing module. The integrated module may be implemented in a form of hardware, or may be implemented in a form of a software functional module. It should be noted that, in embodiments of this application, division of the modules is an example and is merely logical function division, and there may be other division in an actual implementation. An example in which the function modules are obtained through division in correspondence to the functions is used for description below.

The distributed system described above is run in the collaborating device. The collaborating device includes:

a processing unit, configured to: after receiving a request for calling a first teaching service in a first device, perform at least one of the following operations:

controlling, through a video capture service, a camera apparatus in the collaborating device to capture a second video;

controlling, through a video processing service, the collaborating device to process a first video and/or the second video, where the first video is a teaching video;

controlling, through a voice broadcast service, a speaker in the collaborating device to play a comparison analysis result, where the comparison analysis result is a comparison analysis result of the first video and the second video; and controlling, through a motion data acquisition service, a motion data acquisition apparatus in the collaborating device to acquire motion data, where the video capture service, the video processing service, the voice broadcast service, and the motion data acquisition service are all first-type services.

The processing unit may be a first-type service.

In another embodiment of this application, the collaborating device further includes:

a video migration unit, configured to initiate migration of the first video to a first device.

The video migration unit may be a second-type service.

In another embodiment of this application, the video migration unit is further configured to:

when the first device does not have a first teaching service, push a second teaching service to the first device, where the second teaching service is used to indicate the first device to obtain, based on the second teaching service, a first teaching service adapted to the first device; and send synchronization data of the first video to the first teaching service in the first device; or when the first device does not have a first teaching service, send a second instruction to the first device, where the second instruction is used to instruct the first device to download a first teaching service adapted to the first device; and send synchronization data of the first video to the first teaching service in the first device.

In another embodiment of this application, the collaborating device further includes:

a device determining unit, configured to obtain information about each device in a target network, where the target network is a network in which the collaborating device is located; determine at least one first candidate device based on the information about each device in the target network, where the at least one first candidate device is a device with a video playing function in the target network; and determine the first device from the at least one first candidate device.

In another embodiment of this application, the device determining unit is further configured to:

determine one device with a highest video playing priority in the at least one first candidate device, as the first device; or display information about the at least one first candidate device to indicate a user to select one or more devices based on the displayed information about the at least one first candidate device; and determine the selected one or more devices as the first device.

The device determining unit may exist in a form of the first-type service or the second-type service.

It should be noted that, because content such as information exchange and an execution process between the collaborating device and units is based on a same concept as that in the method embodiments of this application, for details about specific functions of the collaborating device and units and technical effects brought by the collaborating device and units, refer to the method embodiments. Details are not described herein again.

It may be clearly understood by a person skilled in the art that, for the purpose of convenient and brief description, division of the foregoing functional units and modules is taken as an example for illustration. In actual application, the foregoing functions can be allocated to different functional units and modules for implementation according to a requirement, that is, an inner structure of a device is divided into different functional units and modules to implement all or some of the functions described above. Function units and modules in the embodiments may be integrated into one processing unit, or each of the units may exist alone physically, or two or more units are integrated into one unit. The integrated unit may be implemented in a form of hardware, or may be implemented in a form of a software function unit. In addition, specific names of the function units and modules are only used to distinguish the function units and modules from each other, and are not used to limit the protection scope of this application. For a detailed working process of the units and modules in the foregoing system, refer to a corresponding process in the foregoing method embodiments. Details are not described herein again.

An embodiment of this application further provides a computer-readable storage medium. The computer-readable storage medium stores a computer program. When the computer program is executed by a processor, steps in the foregoing method embodiments may be implemented.

An embodiment of this application further provides a computer program product. When the computer program product runs on an electronic device, the electronic device is enabled to implement steps in the foregoing method embodiments.

When the integrated unit is implemented in the form of a software functional unit and sold or used as an independent product, the integrated unit may be stored in a computer-readable storage medium. Based on such an understanding, all or some of processes for implementing the methods of the foregoing embodiments in this application can be completed by instructing relevant hardware through a computer program. The computer program may be stored in a computer-readable storage medium. When the computer program is executed by a processor, steps in the foregoing method embodiments may be implemented. The computer program includes computer program code, and the computer program code may be in a source code form, an object code form, an executable file, some intermediate forms, or the like. The computer-readable medium may include at least any entity or apparatus, a recording medium, a computer memory, a read-only memory (ROM), a random access memory (RAM), an electrical carrier signal, a telecommunication signal, and a software distribution medium that are capable of carrying computer program code to a first device, for example, a USB flash drive, a removable hard disk, a magnetic disk, or an optical disc. In some jurisdictions, based on legislation and patent practice, the computer-readable medium may not be an electrical carrier signal or a telecommunication signal.

An embodiment of this application further provides a chip system. The chip system includes a processor. The processor is coupled to a memory, and the processor executes a computer program stored in the memory, to implement steps in any method embodiment of this application. The chip system may be a single chip or a chip module formed by a plurality of chips.

In the foregoing embodiments, the descriptions of each embodiment have respective focuses. For a part that is not described in detail in an embodiment, reference may be made to related descriptions in other embodiments.

A person of ordinary skill in the art may be aware that the units and method steps described with reference to the examples in embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

The foregoing embodiments are merely intended for describing the technical solutions of this application, but not for limiting this application. Although this application is described in detail with reference to the foregoing embodiments, a person of ordinary skill in the art should understand that modifications may still be made to the technical solutions described in the foregoing embodiments or equivalent replacements may be made to some technical features thereof, without departing from the spirit and scope of the technical solutions of embodiments of this application.

What is claimed is:

1. A multi-device collaboration method, applied to a first device in which a distributed system is run, wherein the distributed system comprises a system service, a first-type service located at an upper layer of the system service, and a second-type service located at an upper layer of the first-type service and having an interface display function, wherein both the first-type service and the second-type service are atomic services, and wherein the method comprises:

playing, by the first device through a first teaching service in the first device, a first video synchronized by a second device through a second teaching service in the second device, wherein the first teaching service and the second teaching service belong to the second-type service;

calling, by the first device, a video capture service in a third device through the first teaching service, wherein the video capture service is used to control a camera apparatus in the third device to capture a second video;

calling, by the first device, a video processing service in a fourth device through the first teaching service, wherein the video processing service is used to control the fourth device to process the first video and the second video to obtain a comparison analysis result of the first video and the second video; and calling, by the first device, a voice broadcast service in a fifth device through the first teaching service, wherein the voice broadcast service is used to control a speaker in the fifth device to play the comparison analysis result, wherein the video capture service, the video processing service, and the voice broadcast service are all first-type services.

2. The method according to claim 1, further comprising:
calling, by the first device, a motion data acquisition service in a sixth device through the first teaching service, wherein the motion data acquisition service is used to control the sixth device to acquire motion data, and the motion data acquisition service is a first-type service.

3. The method according to claim 1, wherein before the calling, by the first device, a video capture service in a third device through the first teaching service, the method further comprises:

obtaining, by the first device, information about each device in a target network, wherein the target network is a network in which the first device is located;

determining, by the first device, at least one third candidate device based on the information about each device in the target network, wherein the at least one third candidate device is a device with a video capture function in the target network; and determining, by the first device, the third device from the at least one third candidate device.

4. The method according to claim 3, wherein the determining, by the first device, the third device from the at least one third candidate device comprises:

determining, by the first device, one or more devices with a highest video capture priority that are in the at least one third candidate device, as the third device; or displaying, by the first device, information about the at least one third candidate device through the first teaching service, to indicate a user to select one or more devices based on the displayed information about the at least one third candidate device; and determining, by the first device, the selected one or more devices as the third device.

5. The method according to claim 3, wherein after the determining, by the first device, the third device from the at least one third candidate device, the method further comprises:
- in response to the third device not having the video capture service, sending, by the first device, a first instruction to the third device, wherein the first instruction is used to instruct the third device to download a video capture service adapted to the third device; or
- in response to the third device not having the video capture service, sending, by the first device, a video capture service in the first device to the third device, wherein the video capture service in the first device is used to indicate the third device to obtain, based on the video capture service in the first device, a video capture service adapted to the third device.

6. The method according to claim 1, wherein the playing, by the first device through a first teaching service in the first device, a first video synchronized by a second device through a second teaching service in the second device comprises:
- in response to the first device not having the first teaching service, obtaining, by the first device, a first teaching service adapted to the first device;
- receiving, by the first device through the first teaching service, synchronization data of the first video sent by the second teaching service in the second device, and playing, by the first device, the first video through the first teaching service based on the synchronization data; or
- in response to the first device having the first teaching service, after the first device receives synchronization data of the first video through the first teaching service, playing, by the first device, the first video through the first teaching service based on the synchronization data.

7. The method according to claim 6, wherein the obtaining, by the first device, a first teaching service adapted to the first device comprises:
- after receiving a second instruction sent by the second device, downloading, by the first device, the first teaching service adapted to the first device; or
- after receiving the second teaching service sent by the second device, obtaining, by the first device based on the second teaching service, the first teaching service adapted to the first device.

8. The method according to claim 1, wherein in response to there being a plurality of fourth devices, the calling, by the first device, a video processing service in a fourth device through the first teaching service comprises:
- calling, by the first device, video processing services in at least two fourth devices in a serial manner through the first teaching service to control the at least two fourth devices to process the first video and/or the second video in a serial manner; and/or
- calling, by the first device, video processing services in at least two fourth devices in a parallel manner through the first teaching service to control the at least two fourth devices to process the first video and/or the second video in a parallel manner.

9. A multi-device collaboration method, applied to a collaborating device in which a distributed system is run, wherein the distributed system comprises a system service and a first-type service located at an upper layer of the system service, and wherein the first-type service is an atomic service, and the method comprises:

performing, by the collaborating device, the following operations after receiving a calling request sent by a first device through a first teaching service in the first device:
- in response to the calling request being a request for calling a video capture service, controlling, by the collaborating device through a video capture service in the collaborating device, a camera apparatus in the collaborating device to capture a second video;
- in response to the calling request being a request for calling a video processing service, controlling, by the collaborating device through a video processing service in the collaborating device, the collaborating device to process a first video and/or the second video, wherein the first video is a teaching video;
- in response to the calling request being a request for calling a voice broadcast service, controlling, by the collaborating device through a voice broadcast service in the collaborating device, a speaker in the collaborating device to play a comparison analysis result, wherein the comparison analysis result is a comparison analysis result of the first video and the second video; and
- in response to the calling request being a request for calling a motion data acquisition service, controlling, by the collaborating device through the motion data acquisition service in the collaborating device, a motion data acquisition apparatus in the collaborating device to acquire motion data,
wherein the video capture service, the video processing service, the voice broadcast service, and the motion data acquisition service are all first-type services.

10. The method according to claim 9, wherein the distributed system further comprises a second-type service located at an upper layer of the first-type service and having an interface display function, and wherein the second-type service is an atomic service; and the method further comprises:
initiating, by the collaborating device, migration of the first video to the first device through a second teaching service in the collaborating device, wherein the second teaching service is the second-type service.

11. The method according to claim 10, wherein the initiating, by the collaborating device, migration of the first video to the first device through the second teaching service in the collaborating device comprises:
- in response to the first device not having a first teaching service, pushing, by the collaborating device, the second teaching service to the first device, wherein the second teaching service is used to indicate the first device to obtain, based on the second teaching service, a first teaching service adapted to the first device; and
sending, by the collaborating device, synchronization data of the first video to the first teaching service in the first device through the second teaching service; or
- in response to the first device not having a first teaching service, sending, by the collaborating device, a second instruction to the first device, wherein the second instruction is used to instruct the first device to download a first teaching service adapted to the first device; and
sending, by the collaborating device, synchronization data of the first video to the first teaching service in the first device through the second teaching service.

12. The method according to claim 10, wherein before the initiating, by the collaborating device, migration of the first video to the first device through a second teaching service in the collaborating device, the method further comprises:
- obtaining, by the collaborating device, information about each device in a target network, wherein the target network is a network in which the collaborating device is located;
- determining, by the collaborating device, at least one first candidate device based on the information about each device in the target network, wherein the at least one first candidate device is a device with a video playing function in the target network; and
- determining, by the collaborating device, the first device from the at least one first candidate device.

13. The method according to claim 12, wherein the determining, by the collaborating device, the first device from the at least one first candidate device comprises:
- determining, by the collaborating device, one device with a highest video playing priority in the at least one first candidate device, as the first device; or
- displaying, by the collaborating device, information about the at least one first candidate device through the second teaching service, to indicate a user to select one device based on the displayed information about the at least one first candidate device; and
- determining, by the collaborating device, the selected one device as the first device.

14. A first device, comprising:
- at least one processor, and
- a memory storing programming, the programming including instructions that, in response to being executed by the at least one processor, cause the first device to perform the operations including:
- playing through a first teaching service in the first device, a first video synchronized by a second device through a second teaching service in the second device, wherein the first teaching service and the second teaching service belong to the second-type service;
- calling a video capture service in a third device through the first teaching service, wherein the video capture service is used to control a camera apparatus in the third device to capture a second video;
- calling a video processing service in a fourth device through the first teaching service, wherein the video processing service is used to control the fourth device to process the first video and the second video to obtain a comparison analysis result of the first video and the second video; and
- calling a voice broadcast service in a fifth device through the first teaching service, wherein the voice broadcast service is used to control a speaker in the fifth device to play the comparison analysis result,
- wherein the video capture service, the video processing service, and the voice broadcast service are all first-type services.

15. The first device according to claim 14, the operations further comprising:
- calling a motion data acquisition service in a sixth device through the first teaching service, wherein the motion data acquisition service is used to control the sixth device to acquire motion data, and the motion data acquisition service is a first-type service.

16. The first device according to claim 14, the operations further comprising:
- wherein before the calling a video capture service in a third device through the first teaching service,
- obtaining information about each device in a target network, wherein the target network is a network in which the first device is located;
- determining at least one third candidate device based on the information about each device in the target network, wherein the at least one third candidate device is a device with a video capture function in the target network; and
- determining the third device from the at least one third candidate device.

17. The first device according to claim 16, wherein the determining the third device from the at least one third candidate device comprises:
- determining one or more devices with a highest video capture priority that are in the at least one third candidate device, as the third device; or
- displaying information about the at least one third candidate device through the first teaching service, to indicate a user to select one or more devices based on the displayed information about the at least one third candidate device; and
- determining the selected one or more devices as the third device.

18. The first device according to claim 16, the operations further comprising:
- wherein after the determining the third device from the at least one third candidate device,
- in response to the third device not having the video capture service, sending a first instruction to the third device, wherein the first instruction is used to instruct the third device to download a video capture service adapted to the third device; or
- in response to the third device not having the video capture service, sending a video capture service in the first device to the third device, wherein the video capture service in the first device is used to indicate the third device to obtain, based on the video capture service in the first device, a video capture service adapted to the third device.

19. The first device according to claim 14, wherein the playing through a first teaching service in the first device, a first video synchronized by a second device through a second teaching service in the second device comprises:
- in response to the first device not having the first teaching service, obtaining a first teaching service adapted to the first device;
- receiving through the first teaching service, synchronization data of the first video sent by the second teaching service in the second device, and
- playing the first video through the first teaching service based on the synchronization data; or
- in response to the first device having the first teaching service, after the first device receives synchronization data of the first video through the first teaching service, playing the first video through the first teaching service based on the synchronization data.

20. The first device according to claim 19, wherein the obtaining a first teaching service adapted to the first device comprises:
- after receiving a second instruction sent by the second device, downloading the first teaching service adapted to the first device; or
- after receiving the second teaching service sent by the second device, obtaining based on the second teaching service, the first teaching service adapted to the first device.

* * * * *